United States Patent
Korcz et al.

(10) Patent No.: US 12,088,076 B2
(45) Date of Patent: Sep. 10, 2024

(54) PIVOTABLE AND ADJUSTABLE SUPPORT FOR ELECTRICAL DEVICE

(71) Applicant: Hubbell Incorporated, Shelton, CT (US)

(72) Inventors: Krzysztof Korcz, Granger, IN (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 256 days.

(21) Appl. No.: 17/627,335

(22) PCT Filed: Jul. 16, 2020

(86) PCT No.: PCT/US2020/042311
§ 371 (c)(1),
(2) Date: Jan. 14, 2022

(87) PCT Pub. No.: WO2021/011764
PCT Pub. Date: Jan. 21, 2021

(65) Prior Publication Data
US 2022/0278514 A1    Sep. 1, 2022

Related U.S. Application Data

(60) Provisional application No. 62/874,707, filed on Jul. 16, 2019.

(51) Int. Cl.
*H02G 3/08* (2006.01)
*H02G 3/12* (2006.01)
*H02G 3/14* (2006.01)

(52) U.S. Cl.
CPC ............ *H02G 3/081* (2013.01); *H02G 3/12* (2013.01); *H02G 3/14* (2013.01); *H02G 3/125* (2013.01); *H02G 3/126* (2013.01)

(58) Field of Classification Search
CPC ............ H02G 3/081; H02G 3/12; H02G 3/14; H02G 3/085; H02G 3/126; H02G 3/125; H01R 24/78; H01R 2103/00
See application file for complete search history.

(56) References Cited

U.S. PATENT DOCUMENTS 4,261,189 A * 4/1981 Brumfield, Jr. .......... H02B 1/38
                                                         49/141
5,931,325 A    8/1999 Filipov
(Continued)

FOREIGN PATENT DOCUMENTS

CA        2 995 535 A1    8/2015

OTHER PUBLICATIONS

The extended European search report issued on Jun. 23, 2023, by the European Patent Office in corresponding European Patent Application No. 20840367.5. (11 pages).
(Continued)

*Primary Examiner* — Steven T Sawyer
(74) *Attorney, Agent, or Firm* — Robinson & Cole LLP

(57) ABSTRACT

A mud ring supports an electrical device with respect to a junction box. The mud ring includes a base member configured to be coupled to the junction box; a cover coupled to the base member for movement between a first position and a second position, the cover including an opening; and an insert positioned in the opening and supported for movement relative to the cover, the insert configured to be coupled to the electrical device.

20 Claims, 23 Drawing Sheets

(56) References Cited

U.S. PATENT DOCUMENTS

| | | | |
|---|---|---|---|
| 6,184,468 B1* | 2/2001 | Speziale | H02G 3/14 |
| | | | 220/241 |
| 9,595,819 B1* | 3/2017 | Bonino | H02G 3/088 |
| 9,806,507 B2* | 10/2017 | Gross | H02G 3/086 |
| 2006/0102371 A1* | 5/2006 | Reynolds | H02G 3/086 |
| | | | 174/50 |
| 2010/0206603 A1 | 8/2010 | Drane | |
| 2013/0248243 A1* | 9/2013 | Dinh | H02G 3/081 |
| | | | 174/535 |
| 2014/0262417 A1 | 9/2014 | Korcz et al. | |
| 2014/0318853 A1* | 10/2014 | Korcz | H02G 3/08 |
| | | | 248/220.21 |
| 2016/0172831 A1* | 6/2016 | Korcz | H02G 3/185 |
| | | | 174/57 |
| 2017/0085069 A1 | 3/2017 | Bonino | |
| 2018/0109082 A1* | 4/2018 | Garvin | H02G 3/081 |
| 2018/0241187 A1* | 8/2018 | Korcz | H02G 3/081 |
| 2018/0241188 A1 | 8/2018 | Korcz et al. | |

OTHER PUBLICATIONS

Communication pursuant to Rules 70(2) and 70a(2) EPC issued on Jul. 11, 2023, by the European Patent Office in corresponding European Patent Application No. 20840367.5. (1 page).
PCT/US2020/042311 International Search Report and Written Opinion dated Oct. 9, 2020.

* cited by examiner

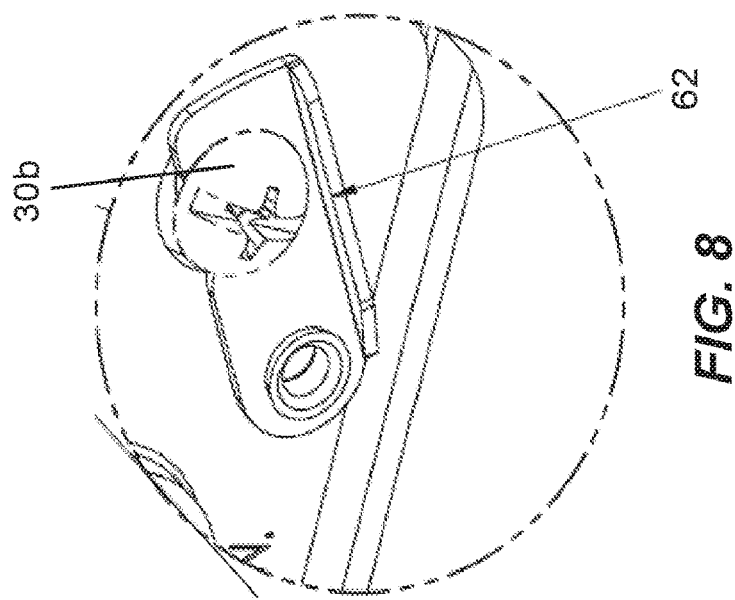
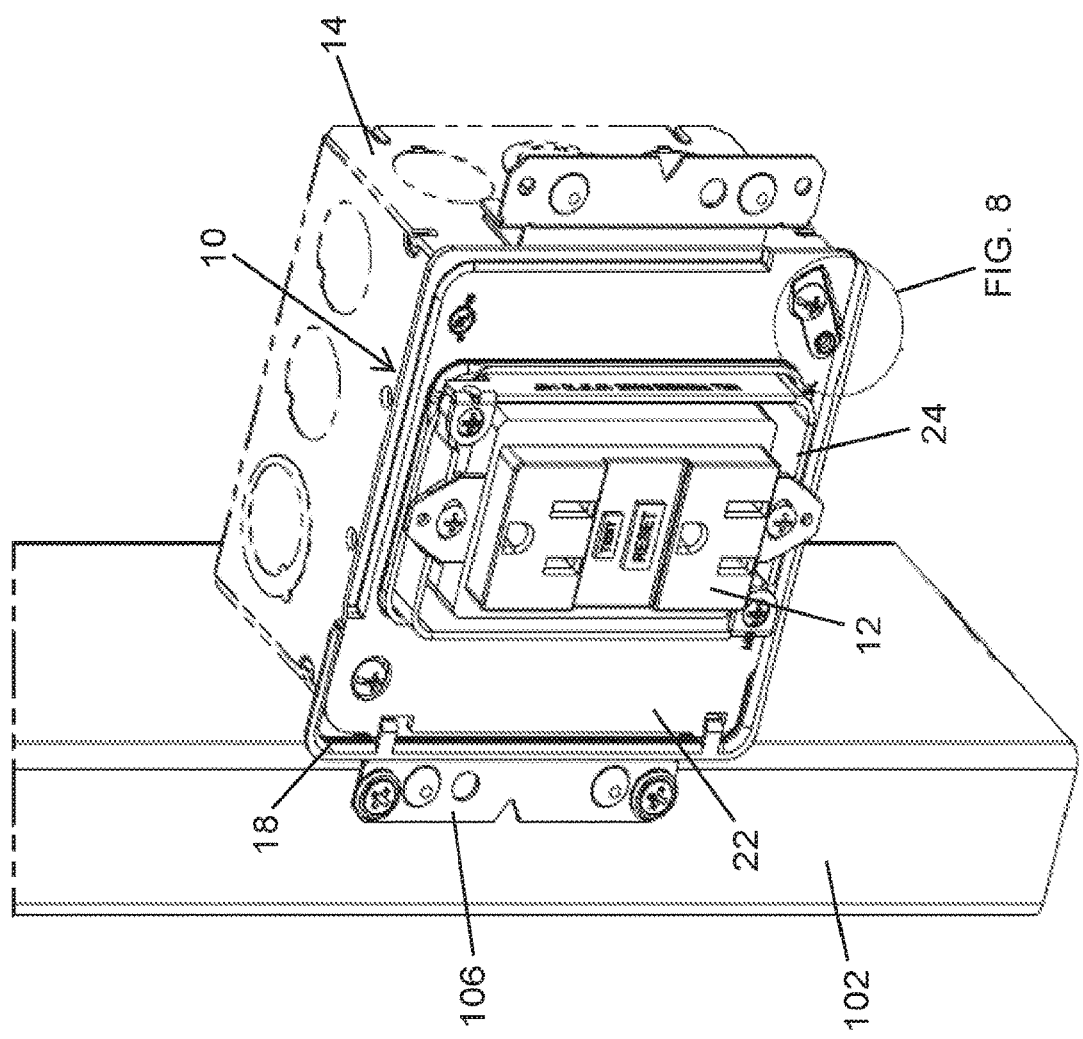
FIG. 7
FIG. 8

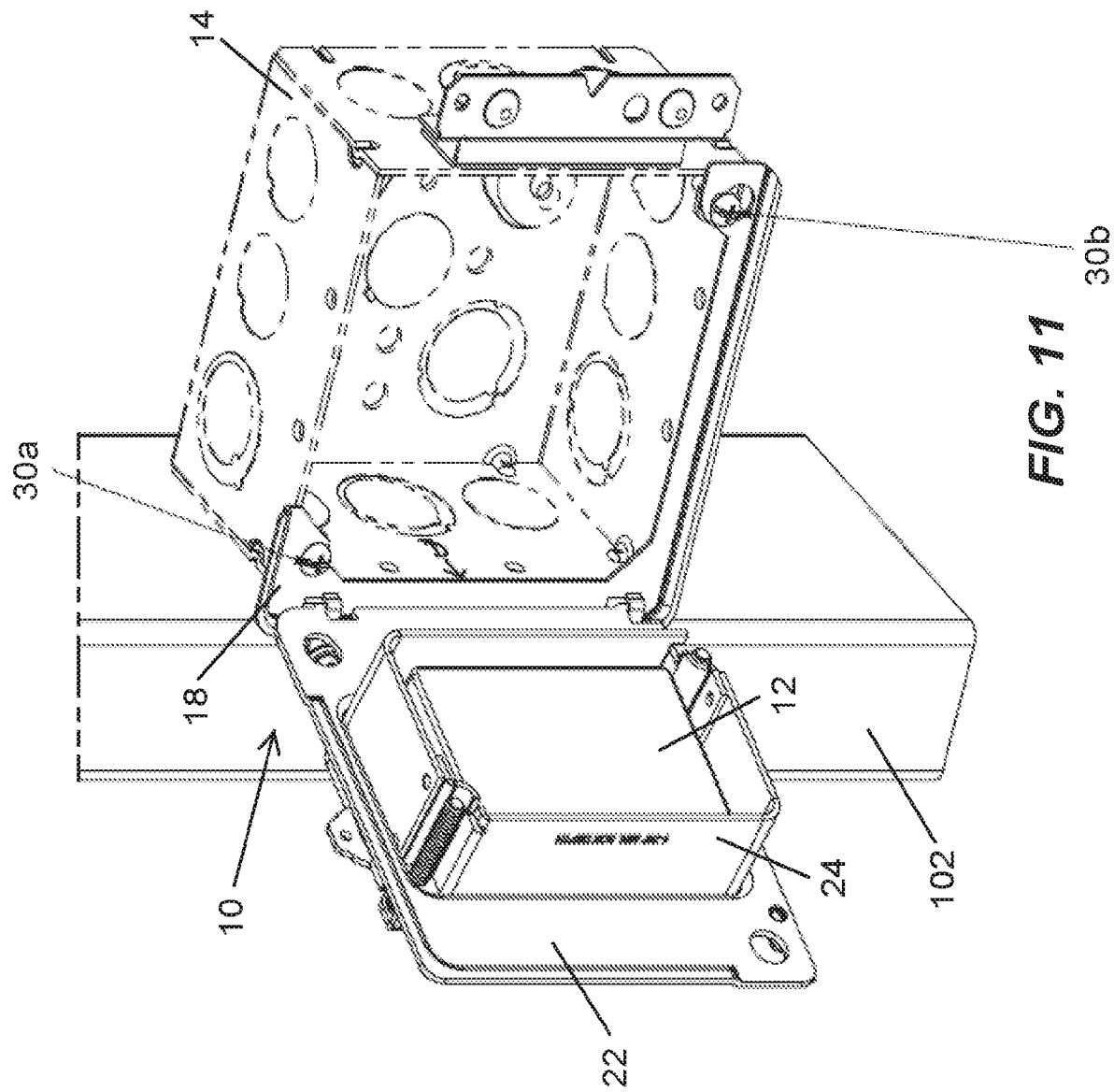

PIVOTABLE AND ADJUSTABLE SUPPORT FOR ELECTRICAL DEVICE

REFERENCE TO RELATED APPLICATION

This application claims the benefit of U.S. Provisional Application No. 62/874,707, filed Jul. 16, 2019, the entire contents of which are incorporated by reference.

TECHNICAL FIELD

The present disclosure relates to supports for electrical devices, and particularly to pivotable and adjustable mud rings.

Electrical devices (e.g., electrical outlets, switches, and others) are typically installed in a wall or ceiling. A gang or junction box is typically secured to a stud or support beam inside the wall or ceiling. The electrical device is then secured in the box in electrical communication with one or more electrical conductors so that the electrical device extends or protrudes from the wall or ceiling. In this manner, any exposed portion of the electrical conductor and its connection to the electrical device is shielded within the box. Support members such as plaster rings, extension rings, and extenders, commonly known as mud rings, are typically attached to the box prior to the installation of sheet rock, wall board, or other covering surface material.

SUMMARY

In one independent aspect, a mud ring for supporting an electrical device with respect to a junction box includes a base member, a cover, and an insert. The base member is configured to be coupled to the junction box. The cover is coupled to the base member for movement between a first position and a second position, and the cover includes an opening. The insert is positioned in the opening and is supported for movement relative to the cover. The insert is configured to be coupled to the electrical device.

In some aspects, the mud ring further includes a latch for selectively securing the cover against movement relative to the base member.

In some aspects, the latch is movable between a latched position and an unlatched position and, when the latch is in the latched position, the latch engages a fastener to secure the cover against movement relative to the base member.

In some aspects, the base member is configured to extend along a portion of a perimeter of the junction box, a first portion of the base member secured to one corner of the junction box and a second portion of the base member positioned adjacent an opposite corner of the junction box.

In some aspects, the base member has a substantially L-shaped profile.

In some aspects, the base member has a substantially C-shaped profile.

In some aspects, the base member is capable of being secured to the junction box in a first configuration and a second configuration.

In some aspects, the base member has a profile that extends around fastener mounting portions of the junction box.

In some aspects, the mud ring further includes an actuator coupled between the insert and the cover for driving the insert to move relative to the cover.

In some aspects, the actuator includes a threaded fastener supported for free rotation relative to one of the insert and the cover, rotation of the threaded fastener causing the insert to translate relative to the cover in a direction normal to a plane of the cover.

In another independent aspect, a mud ring for supporting an electrical device with respect to an electrical box includes a base member, a cover, and an insert. The base member is configured to be coupled to the electrical box. The cover is coupled to the base member for pivoting movement about a pivot axis between a closed position and an open position. The cover permits access to an interior portion the electrical box in the open position, and the cover includes an opening. The insert is positioned in the opening and supported for movement relative to the cover in a direction oriented perpendicular to the pivot axis. The insert is configured to be coupled to the electrical device.

In some aspects, the mud ring further includes a latch for selectively securing the cover against movement relative to the base member.

In some aspects, the latch is movable between a latched position and an unlatched position, and, when the latch is in the latched position, the latch engages a fastener to secure the cover against movement relative to the base member.

In some aspects, the base member is configured to extend along a portion of a perimeter of the electrical box, a first portion of the base member secured to one corner of the electrical box and a second portion of the base member positioned adjacent an opposite corner of the electrical box.

In some aspects, the base member is configured to be coupled to the electrical box by a plurality of fasteners, wherein the plurality of fasteners may engage the base member in a plurality of configurations.

In some aspects, the base member has a profile that extends around fastener mounting portions of the electrical box.

In some aspects, the base member has a substantially L-shaped profile.

In some aspects, the base member has a substantially C-shaped profile.

In some aspects, the mud ring further includes an actuator coupled between the insert and the cover for driving the insert to move relative to the cover.

In some aspects, the actuator includes a threaded fastener supported for free rotation relative to one of the insert and the cover, rotation of the threaded fastener causing the insert to translate relative to the cover in a direction normal to a plane of the cover.

The above-described and other features and advantages of the present disclosure will be appreciated and understood by those skilled in the art from the following detailed description and drawings.

BRIEF DESCRIPTION OF THE DRAWINGS

FIG. 7 is a perspective view of support member, electrical device, and junction box of FIG. 1 supported on a stud, with a latch in a secured position.

FIG. 8 is an enlarged perspective view of the latch of FIG. 7.

FIG. 11 is a perspective view of the support member, electrical device, and junction box of FIG. 7, with a cover in an open position.

DETAILED DESCRIPTION

Figure 1:
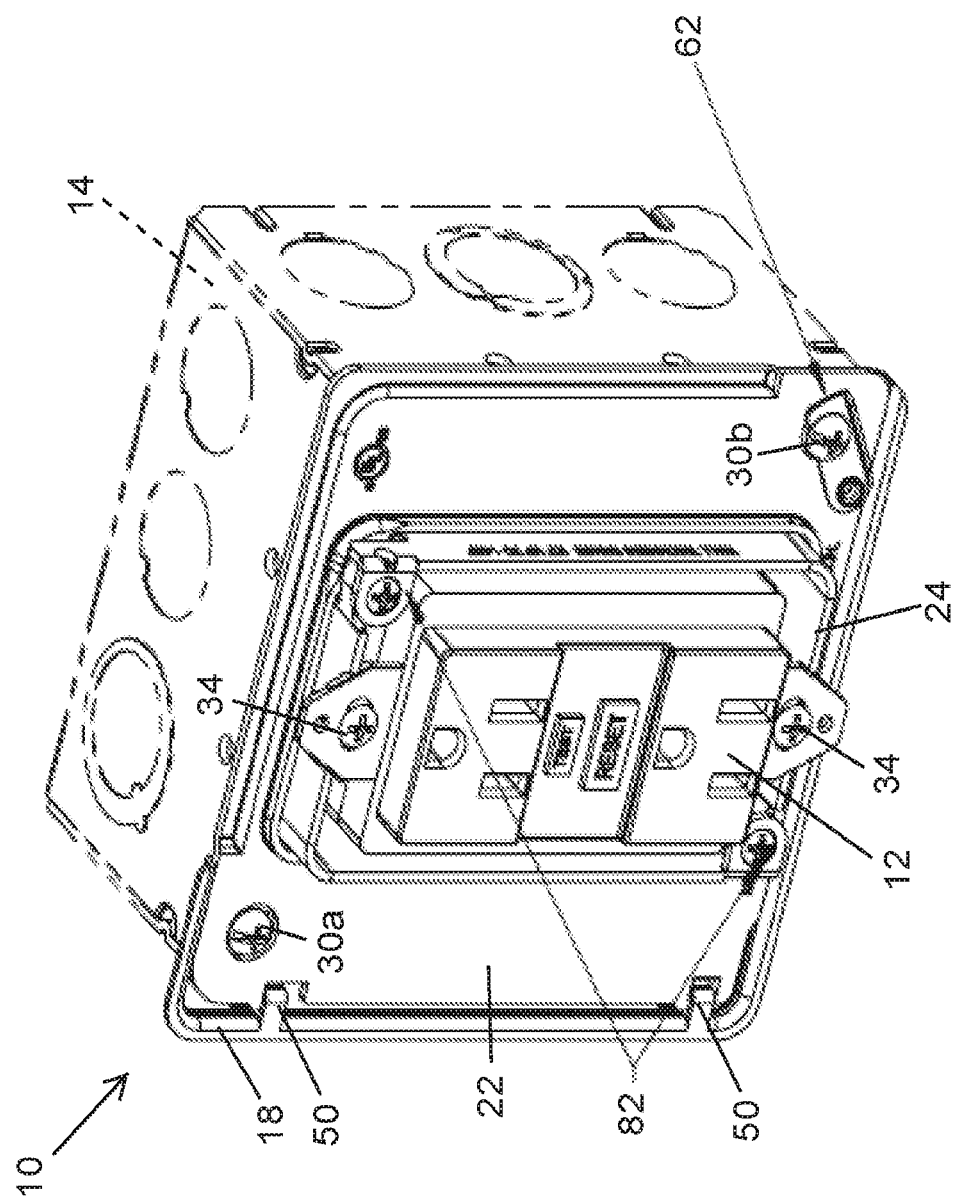
FIG. 1 is a perspective view of a support member supporting an electrical device relative to a junction box, with a latch in a secured position.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

FIGS. 1-4 illustrate a support or mud ring 10 for supporting an electrical device (such as an electrical receptacle or outlet 12) relative to a junction box 14. The mud ring 10 includes a first portion or base member 18, a second portion or cover 22, and a third portion or support or insert 24 coupled to the cover 22. In the illustrated embodiment, the base member 18 is secured to the junction box 14 (e.g., by at least one fastener 30), and the electrical device 12 is secured to the insert 24 (e.g., by fasteners 34).

Figure 4:
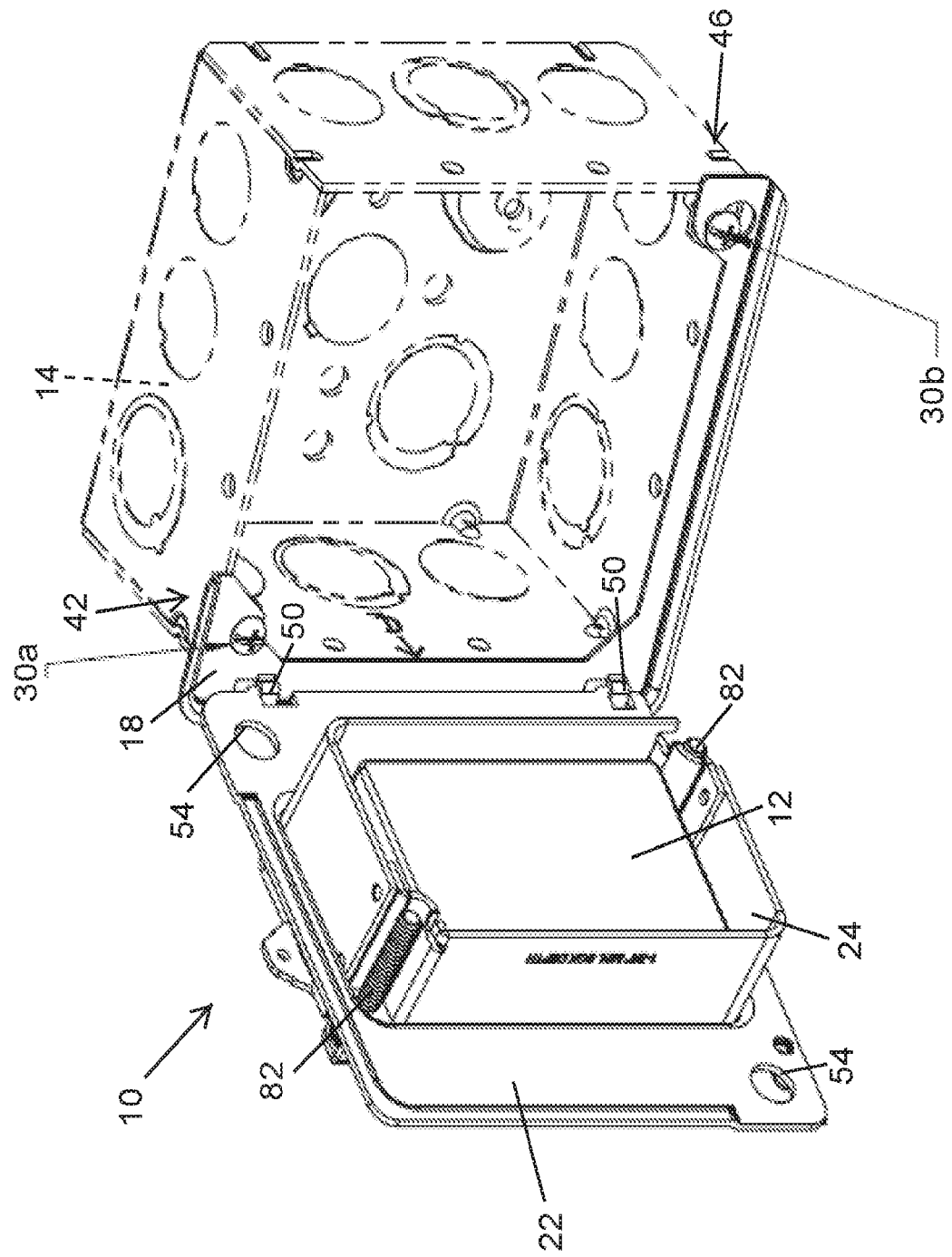
FIG. 4 is a perspective view of the support member, electrical device, and junction box of FIG. 1, with a cover in an open position.

As shown in FIG. 4, in the illustrated embodiment the base member 18 is secured to the junction box 14 by fasteners 30. In some embodiments, at least one of the fasteners 30a is tightened to clamp the base member 18 against the junction box 14, while another of the fasteners 30b is only partially threaded into the box 14 and simply aligns or locates the base member 18 relative to the box 14. Also, as shown in FIG. 4, in the illustrated embodiment the base member 18 extends around a portion of the perimeter of the box 14. The fastener 30a secures one corner 42 of the base member 18 to the box, and the other fastener 30b extends through the base member 18 and is positioned adjacent an opposite corner 46 of the box 14 from the corner 42. The base member 18 has an L-shaped profile, and the base member 18 does not directly engage a substantial portion of the perimeter of the box 14.

Figure 3:
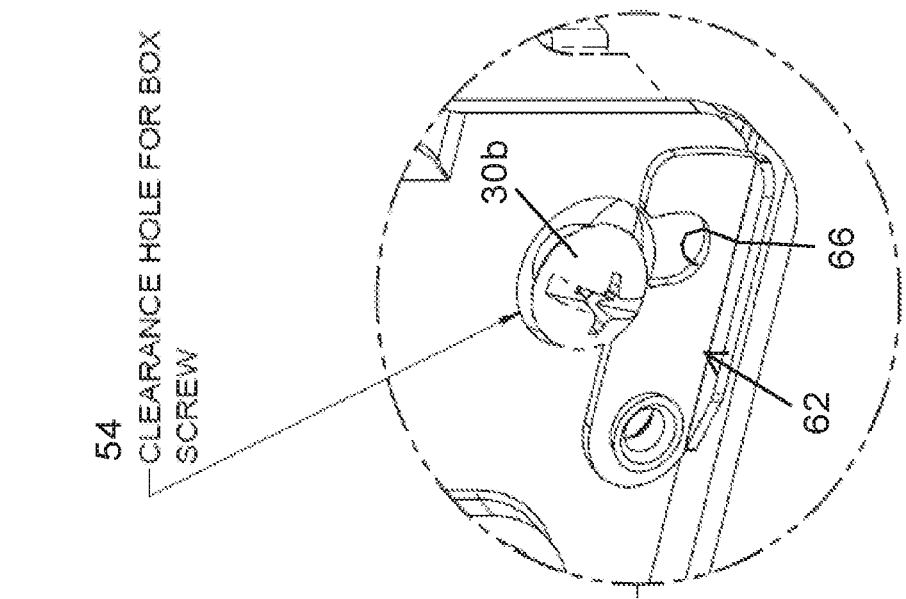
FIG. 3 is an enlarged perspective view of the latch of FIG. 2.
Figure 2:
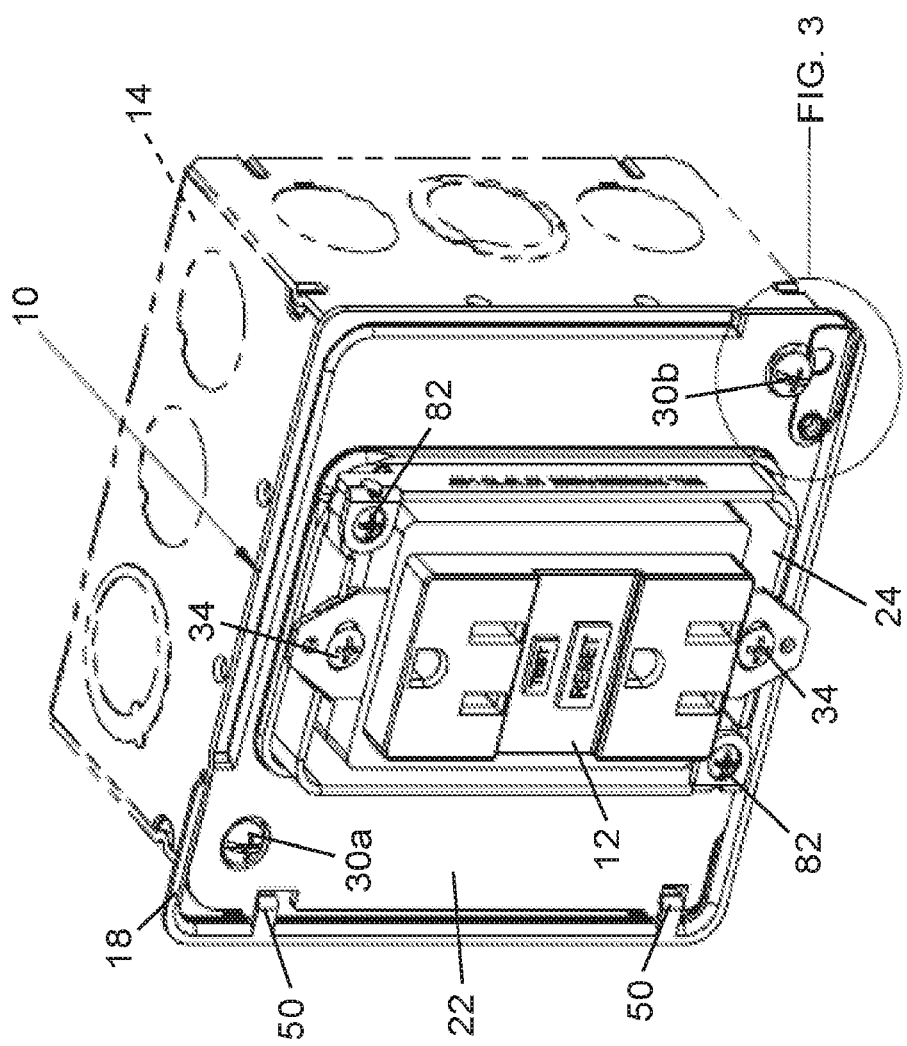
FIG. 2 is a perspective view of the support member, electrical device, and junction box of FIG. 1, with the latch in an unsecured position.

As shown in FIGS. 2-4, the base member 18 supports the cover 22 for pivoting movement. In the illustrated embodiment, the base member 18 and cover 22 are coupled to one another by one or more hinge connections 50, permitting the cover 22 to pivot between a closed position (FIG. 3) and an open position (FIG. 4). The cover 22 is positioned adjacent the base member 18 in the closed position and is positioned away from the base member 18 in the open position to permit access to the interior portion of the junction box 14 and/or the rear portion of the electrical device 12. As shown in FIG. 4, the cover 22 includes clearance holes 54 that are aligned with the fasteners 30 when the cover 22 is in the closed position.

As shown in FIGS. 1-3, a latch 62 is movable between a latched position (FIG. 1) and an unlatched position (FIGS. 2 and 3). In the illustrated embodiment, the latch 62 is an arm supported for pivoting movement on the cover 22 and includes a slot 66. When the cover 22 is positioned in the closed position, the latch 62 may be moved to the latched position in which the latch 62 passes between a head of the fastener 30b and the cover 22 and the slot 66 receives a shaft of the fastener 30b. The latch 62 thereby secures the cover 22 against movement relative to the base member 18. To permit pivoting movement of the cover 22, the latch 62 is moved to the unlatched position.

Figure 5:
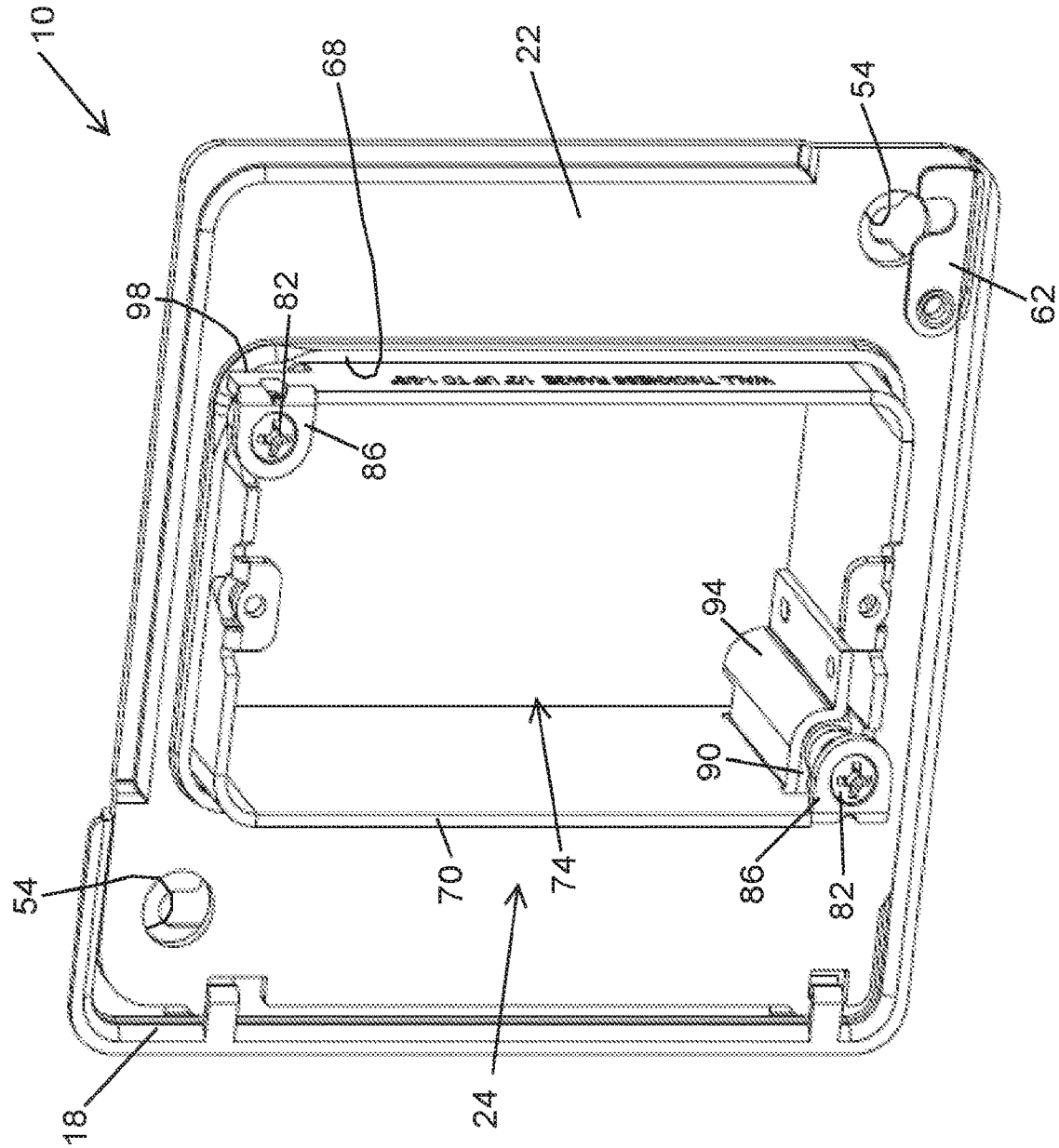
FIG. 5 is a perspective view of the support member of FIG. 1, with a cover in a closed position.
Figure 6:
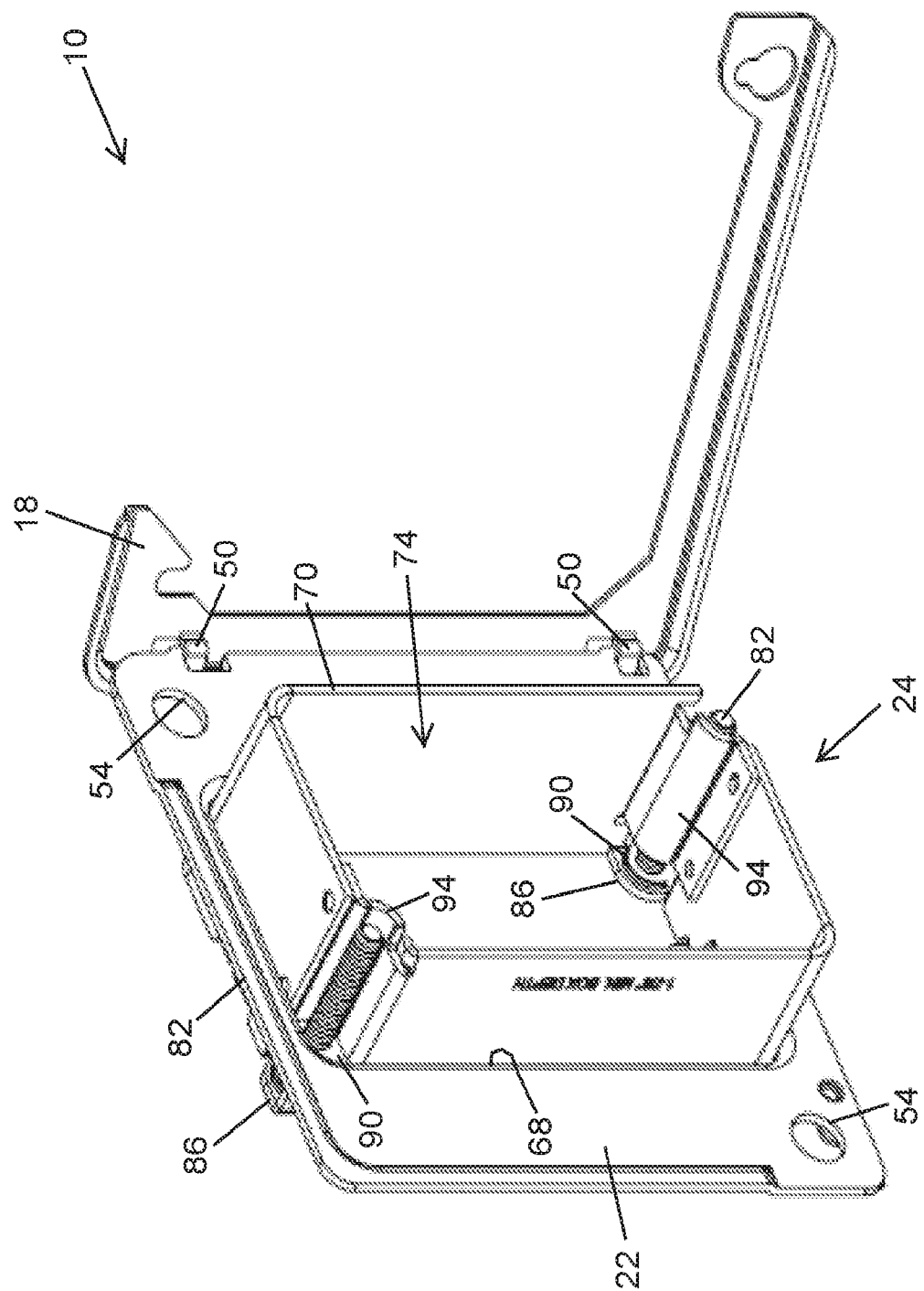
FIG. 6 is a perspective view of the support member of FIG. 5, with a cover in an open position.
Figure 10:
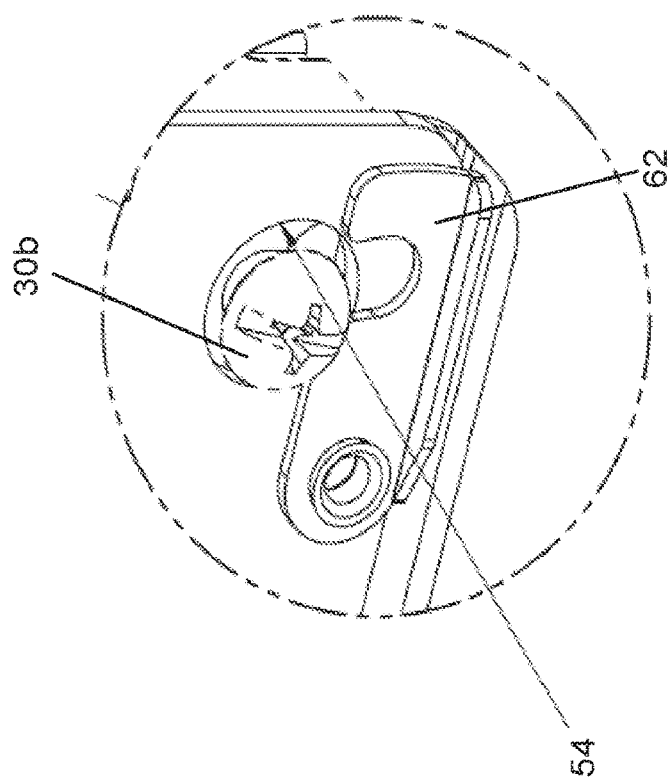
FIG. 10 is an enlarged perspective view of the latch of FIG. 9.
Figure 9:
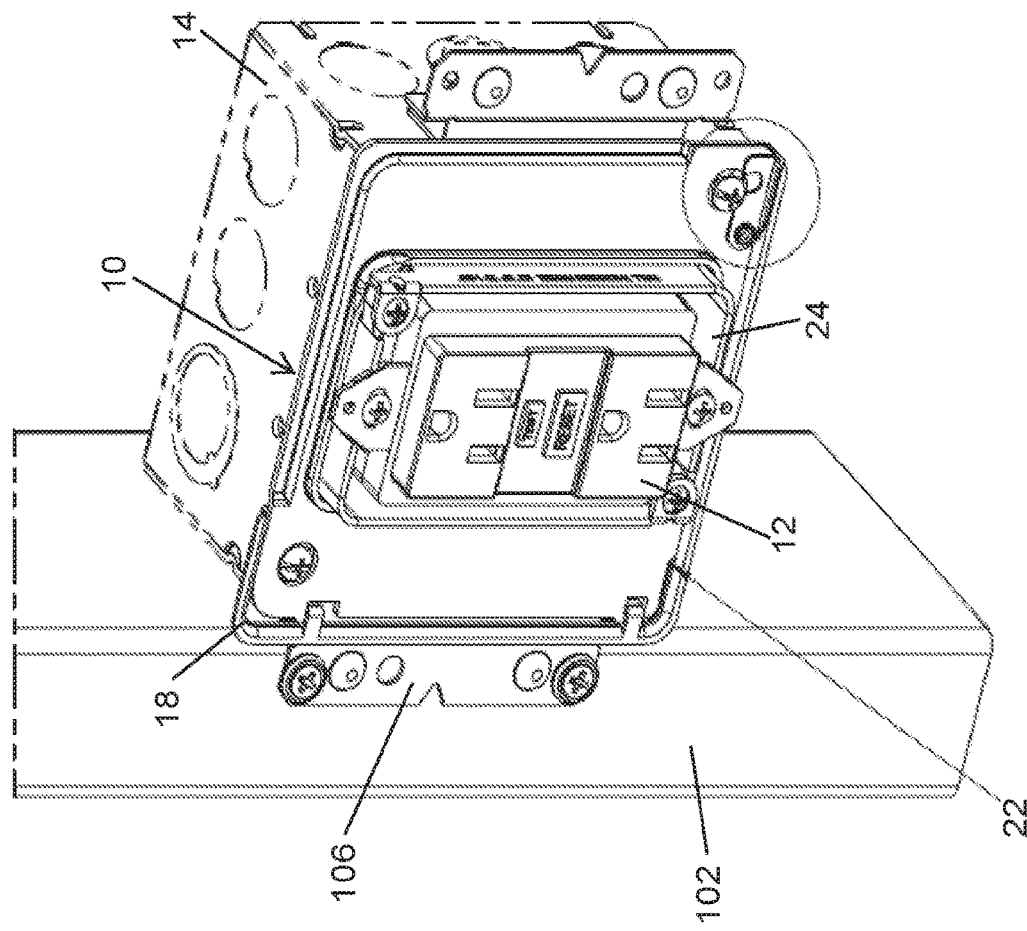
FIG. 9 is a perspective view of support member, electrical device, and junction box of FIG. 7 supported on a stud, with a latch in an unsecured position.

Referring now to FIGS. 5 and 6, the cover 22 includes an opening 68 and the insert 24 is supported in the opening 68 for movement in a direction that is normal to a plane of the cover 22. The insert 24 includes side walls 70 extending around an opening 74, and the electrical device 12 (FIG. 1) is supported in the opening 74. In the illustrated embodiment, the insert 24 is coupled to the cover 22 by a pair of actuators 82 (e.g., threaded fasteners). In other embodiments, the mud ring 10 may include fewer or more actuators 82. The actuators 82 extend through a first flange 86 coupled to the insert 24 and a second flange 90 coupled to the cover 22.

Each actuator 82 is capable of rotating freely relative to the first flange 86 but is secured against movement relative to the first flange 86 in a direction parallel to a longitudinal axis of the actuator 82. Stated another way, the actuator 82 may rotate freely relative to the first flange 86 without moving axially through the first flange 86. In addition, each actuator 82 threadably engages the second flange 90. As a result, rotation of the actuators 82 causes the insert 24 to translate through the opening 68 relative to the cover 22, along an axis normal to a planar portion of the cover 22. Stated another way, rotating the actuators 82 in a first direction causes the insert 24 to protrude further from the cover 22, while rotating the actuators 82 in a second direction causes the insert 24 to recede further through the cover 22 and into the box 14. As a result, the electrical device 12 may be adjusted to a desired position (e.g., flush with a wall surface).

In the illustrated embodiment, the insert 24 includes partitions 94 (FIG. 6) positioned substantially between the actuators 82 and the opening 74 of the insert 24. The partitions 94 may provide a mechanical stop to inhibit movement of the insert 24 in a first direction beyond a predetermined distance relative to the cover 22. Similarly, in the illustrated embodiment a portion 98 (FIG. 5) of the insert 24 can provide a mechanical stop to inhibit movement of the insert 24 in a second direction beyond a predetermined distance.

Figure 12:
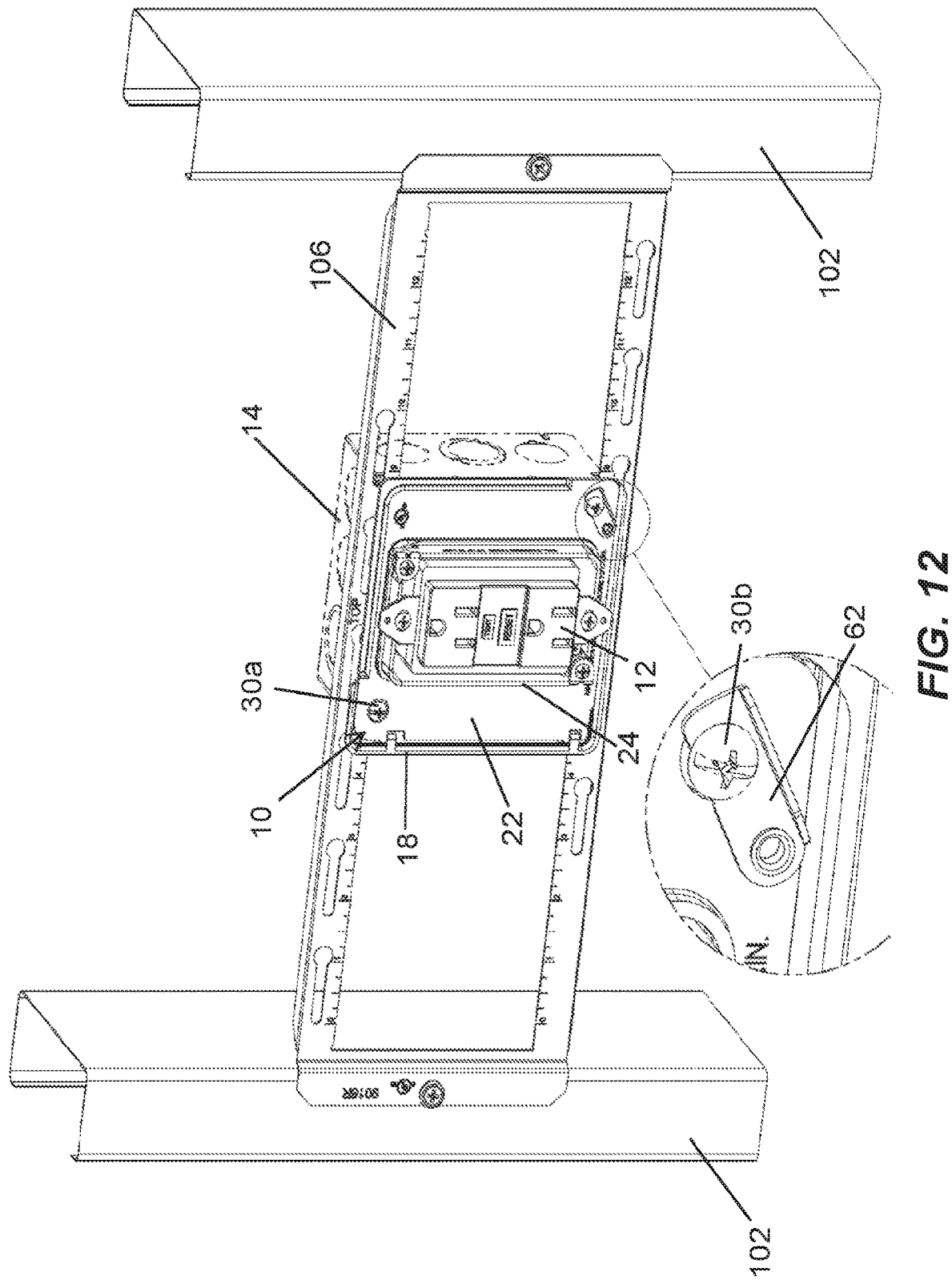
FIG. 12 is a perspective view of support member, electrical device, and junction box of FIG. 1 supported on a bracket positioned between a pair of studs, with a latch in a secured position.

The junction box 14 may be coupled to a single stud 102 by a bracket 106 (FIGS. 7-11) or may be supported on an open center bracket 110 (FIG. 12) positioned between a pair of studs 102. The mud ring 10 can be coupled to the junction 14 box directly. In some embodiments, such as FIG. 12, the bracket 110 may be positioned between the base member 18 of the mud ring 10 and the junction box 14, such that the fasteners 30 extend through the base member 18 and the bracket 110 and engage the box 14.

Figure 13:
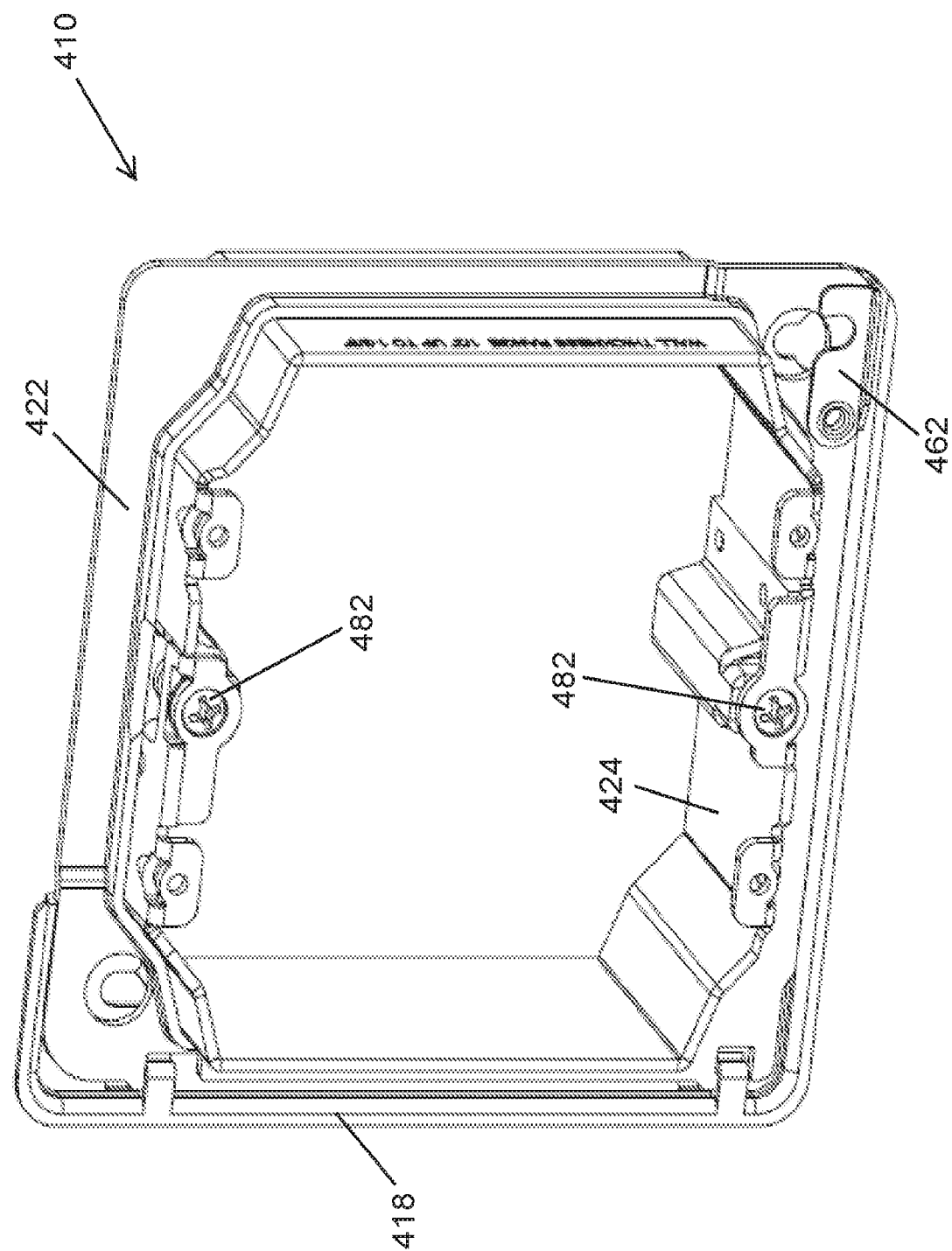
FIG. 13 is a perspective view of a support member according to another embodiment, with a cover in a closed position.
Figure 14:
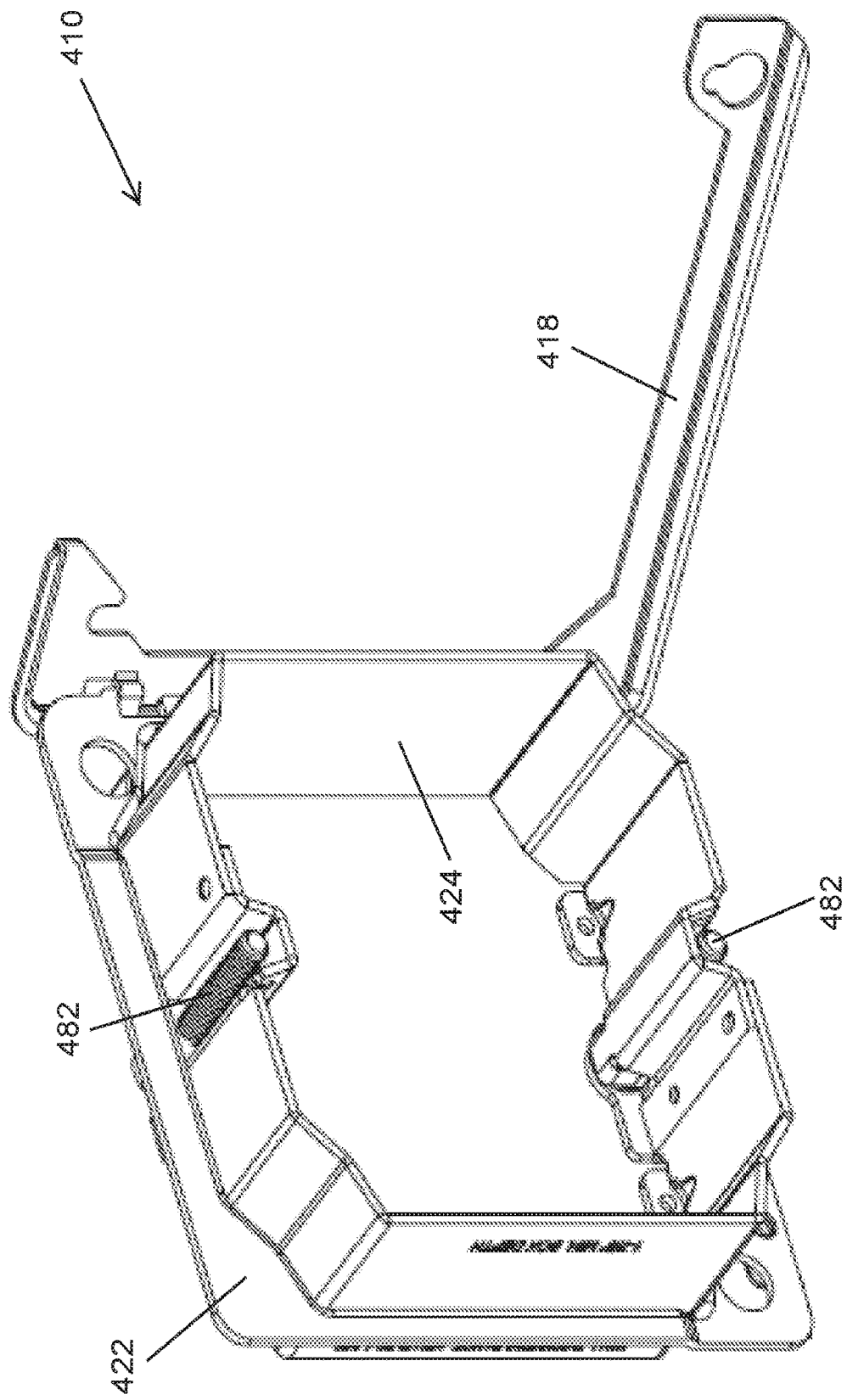
FIG. 14 is a perspective view of the support member of FIG. 13, with the cover in an open position.

In the embodiment of FIGS. 1-12, the mud ring 10 is a single gang mud ring for supporting a single electrical device. FIGS. 13 and 14 illustrate a mud ring 410 according to another embodiment. Similar features of the mud ring 410 are identified using similar reference numbers to mud ring 10, plus 400. The mud ring 410 is a double gang mud ring and is capable of supporting multiple electrical devices (not shown). In the illustrated embodiment, the mud ring 410 includes an insert 424 capable of supporting two electrical devices. Actuators 482 are positioned adjacent upper and lower edges of the insert 424 and between the electrical devices.

FIGS. 15-20 illustrate a mud ring 510 according to another embodiment. Similar features of the mud ring 510 are identified using similar reference numbers to mud ring 10, plus 500. Some differences between the mud ring 10 and the mud ring 510 are discussed herein.

Figure 16:
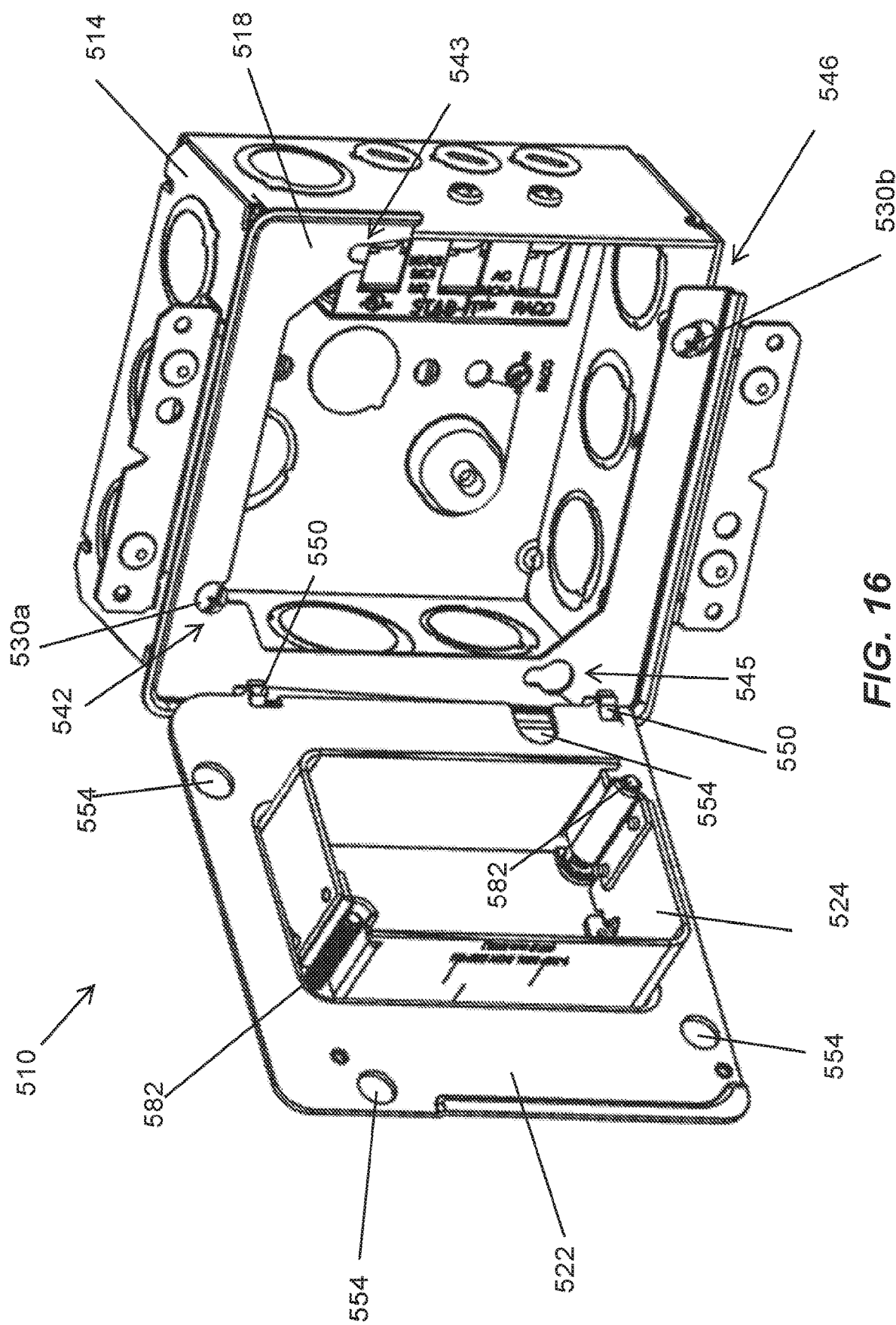
FIG. 16 is a perspective view of the support member and junction box of FIG. 15, with the cover in an open position.
Figure 17:
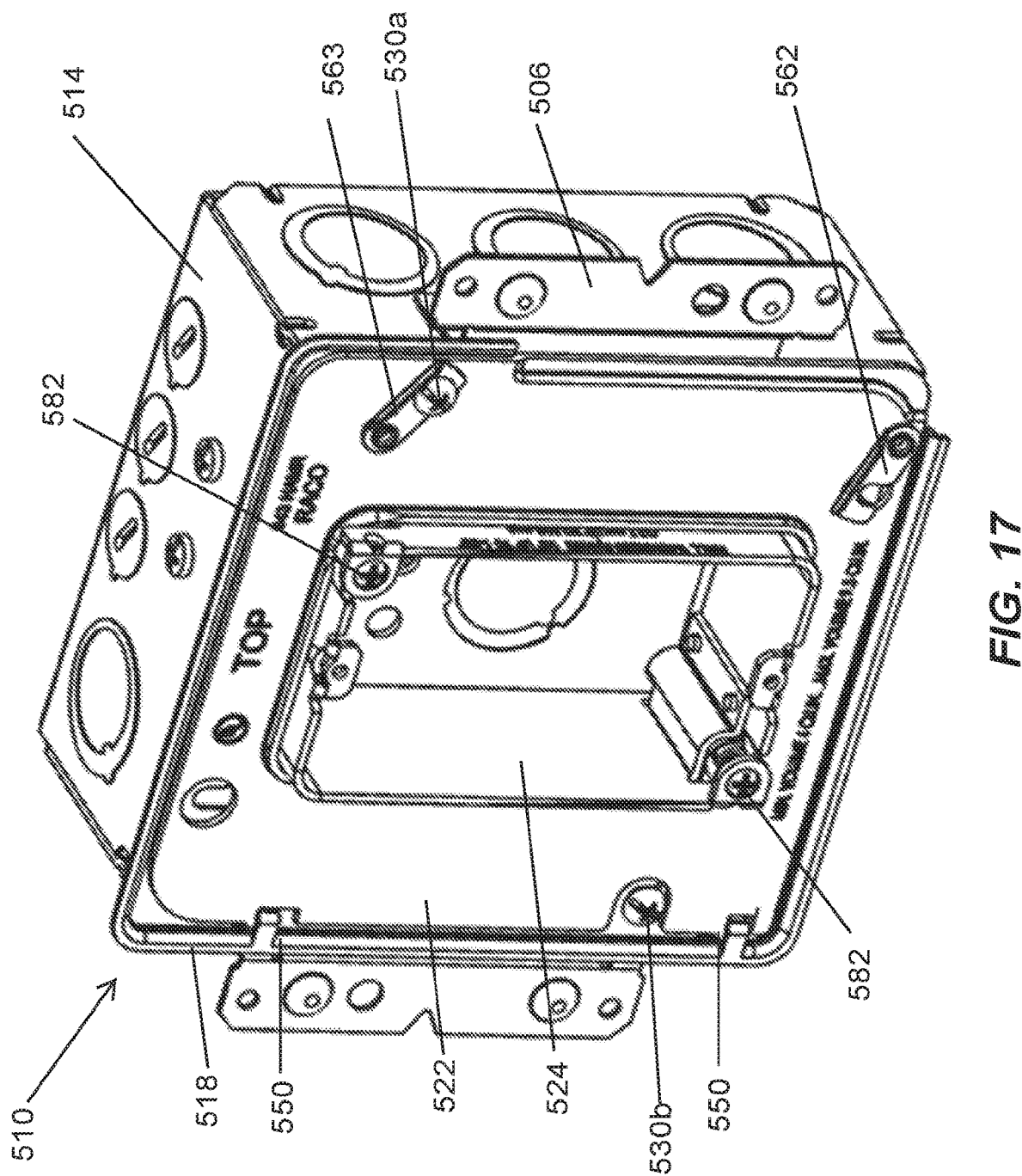
FIG. 17 is a perspective view of the support member and junction box of FIG. 15, with the junction box rotated relative to the support member and the cover in the closed position.
Figure 18:
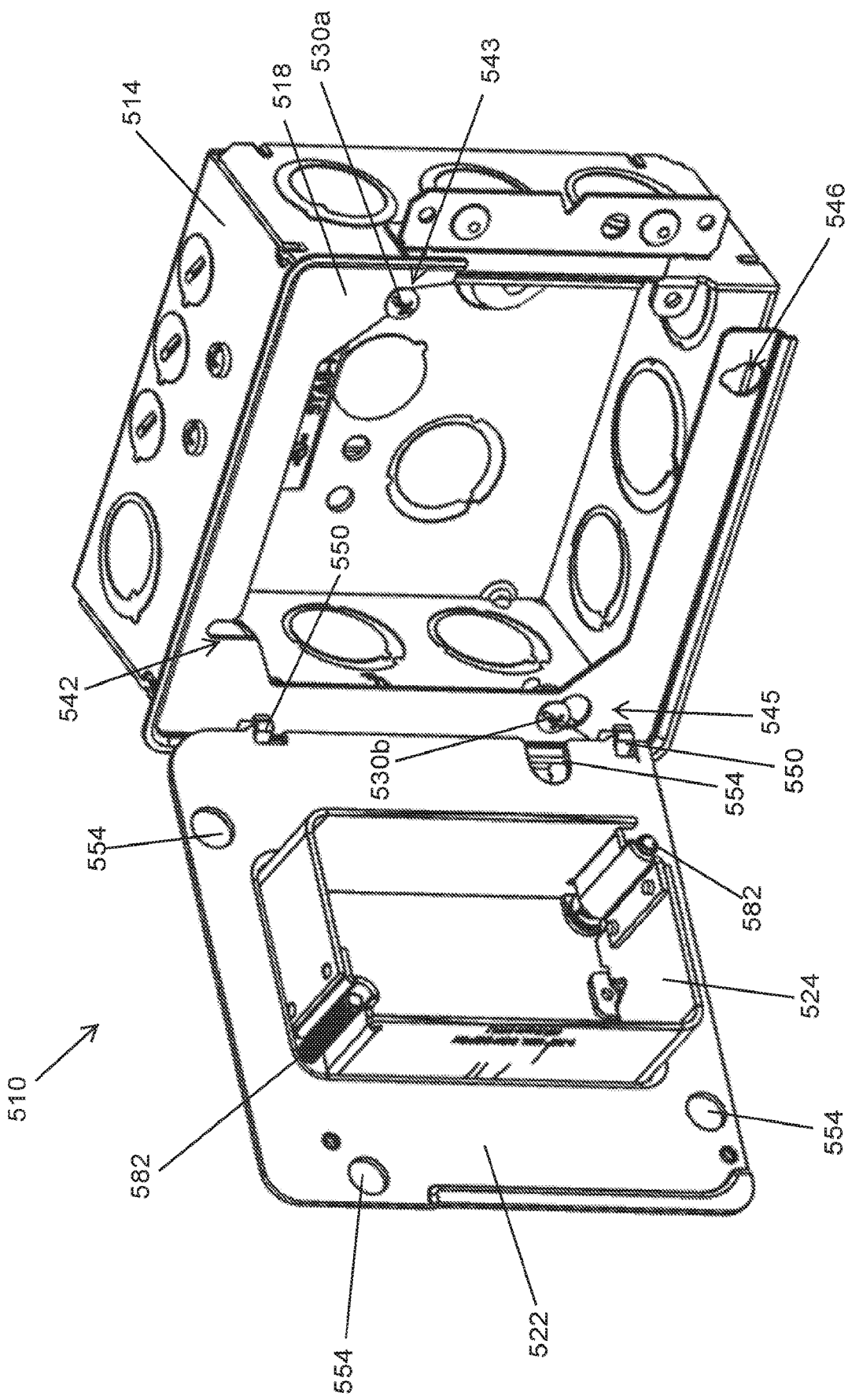
FIG. 18 is a perspective view of the support member and junction box of FIG. 15, with the junction box rotated relative to the support member and the cover in the open position.

The mud ring 510 is a single gang mud ring capable of supporting an electrical device (not shown) relative to a junction box 514. The mud ring 510 is formed such that it can be affixed to the junction box 514 in a first orientation (FIGS. 15 and 16) or in a second orientation (FIGS. 17 and 18). Stated another way, the mud ring 510 may be secured to the junction box 514 in more than one configuration.

Figure 15:
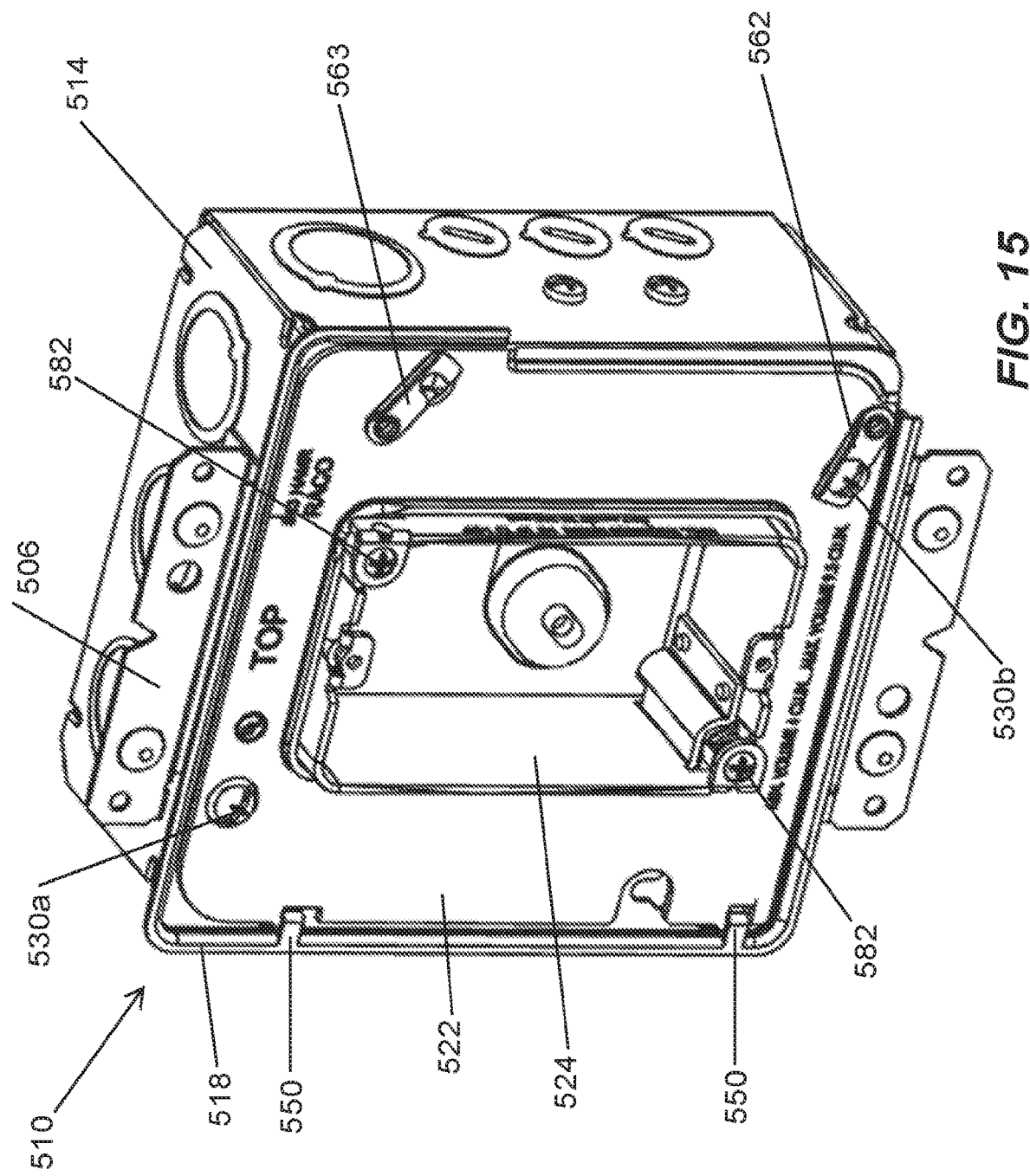
FIG. 15 is a perspective view of a junction box and a support member according to another embodiment, with a cover in a closed position.

The mud ring 510 includes a base member 518 secured to the junction box 514 by at least one fastener 530. In the illustrated embodiments, the base member 518 is secured to the junction box 514 by fasteners 530a, 530b. The base member 518 extends around a portion of the perimeter of the box 514 and has a C-shaped or U-shaped profile. As shown in FIGS. 15 and 16, in a first orientation, the fastener 530a secures one corner 542 (e.g., an upper corner adjacent a hinge 550) of the base member 518 to the junction box 514. The fastener 530b extends through the base member 518 adjacent a corner 546, opposite the corner 542 (e.g., a lower corner opposite the hinge 550, as shown in FIG. 16). As shown in FIGS. 17 and 18, when the junction box 514 is in a second position, the fastener 530a secures a corner 543 of the base member 518 (e.g., an upper corner opposite the hinge, as shown in FIG. 18) to the junction box 514. The fastener 530b extends through an opening of the base member 518 adjacent a corner 545, opposite the corner 543 (e.g., a lower corner adjacent the hinge).

Figure 19:
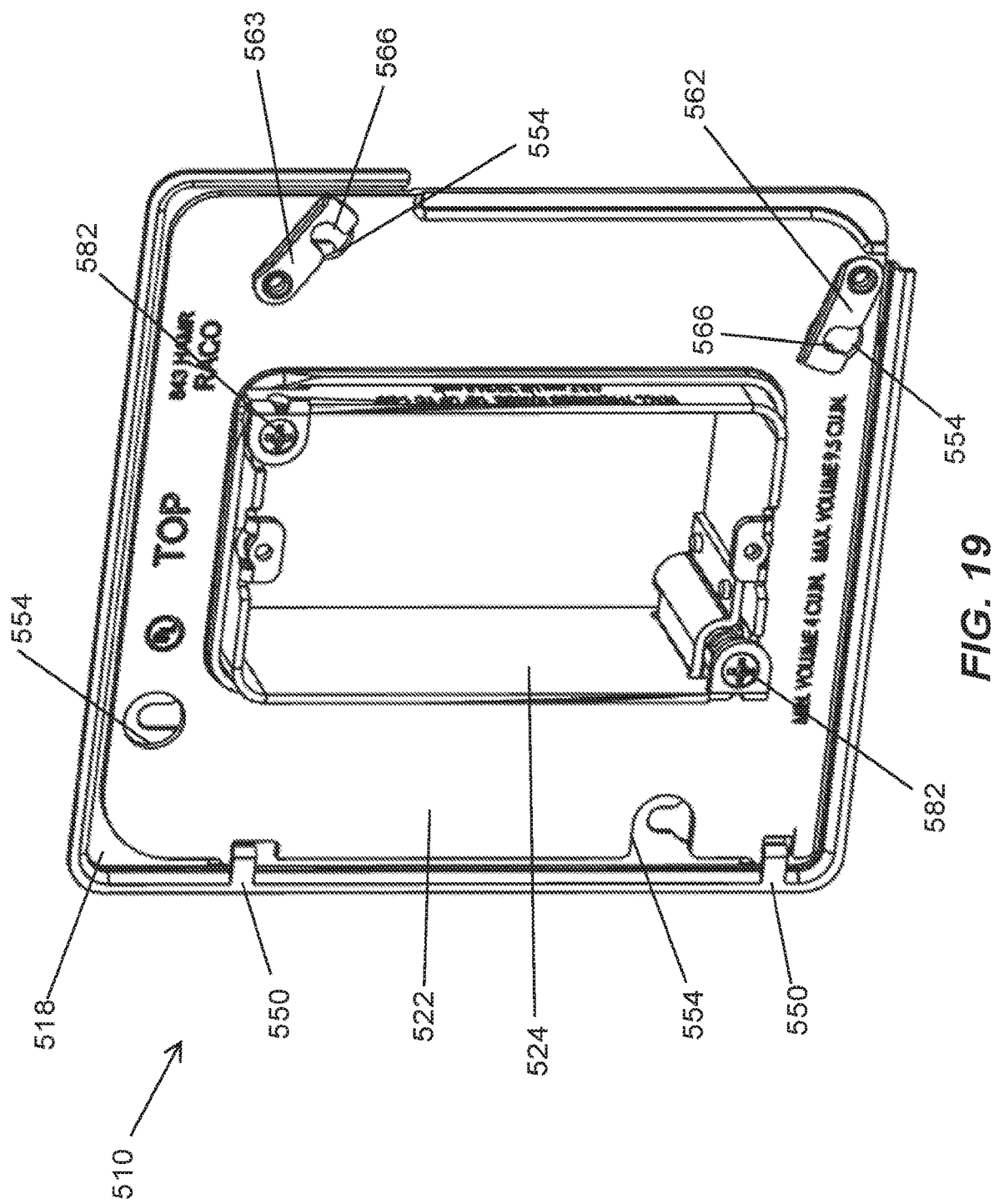
FIG. 19 is a perspective view of the support member of FIG. 15, with the cover in the closed position.
Figure 20:
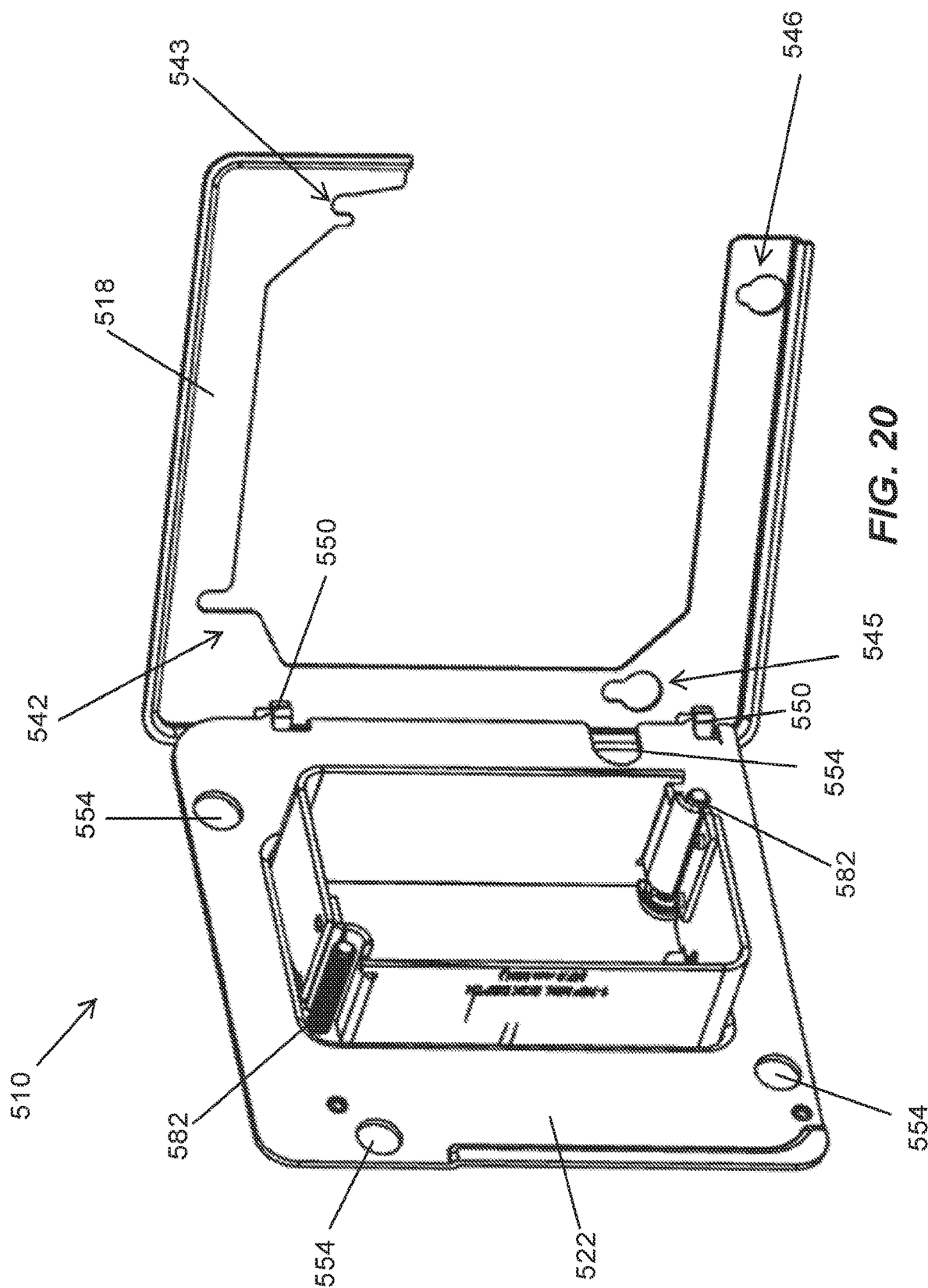
FIG. 20 is a perspective view of the support member of FIG. 15, with the cover in the open position.
Figure 21:
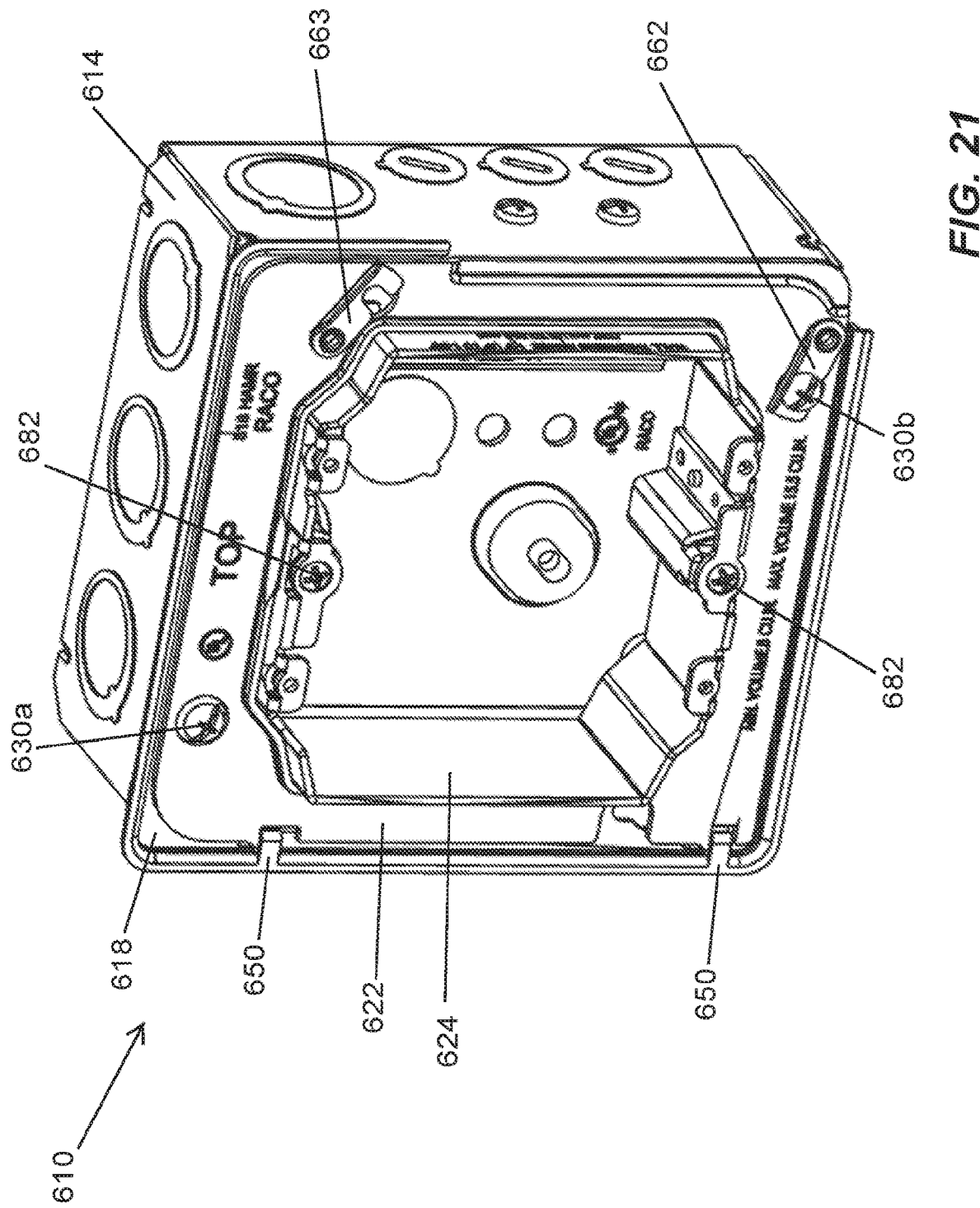
FIG. 21 is a perspective view of a junction box and a support member according to another embodiment, with a cover in a closed position.
Figure 22:
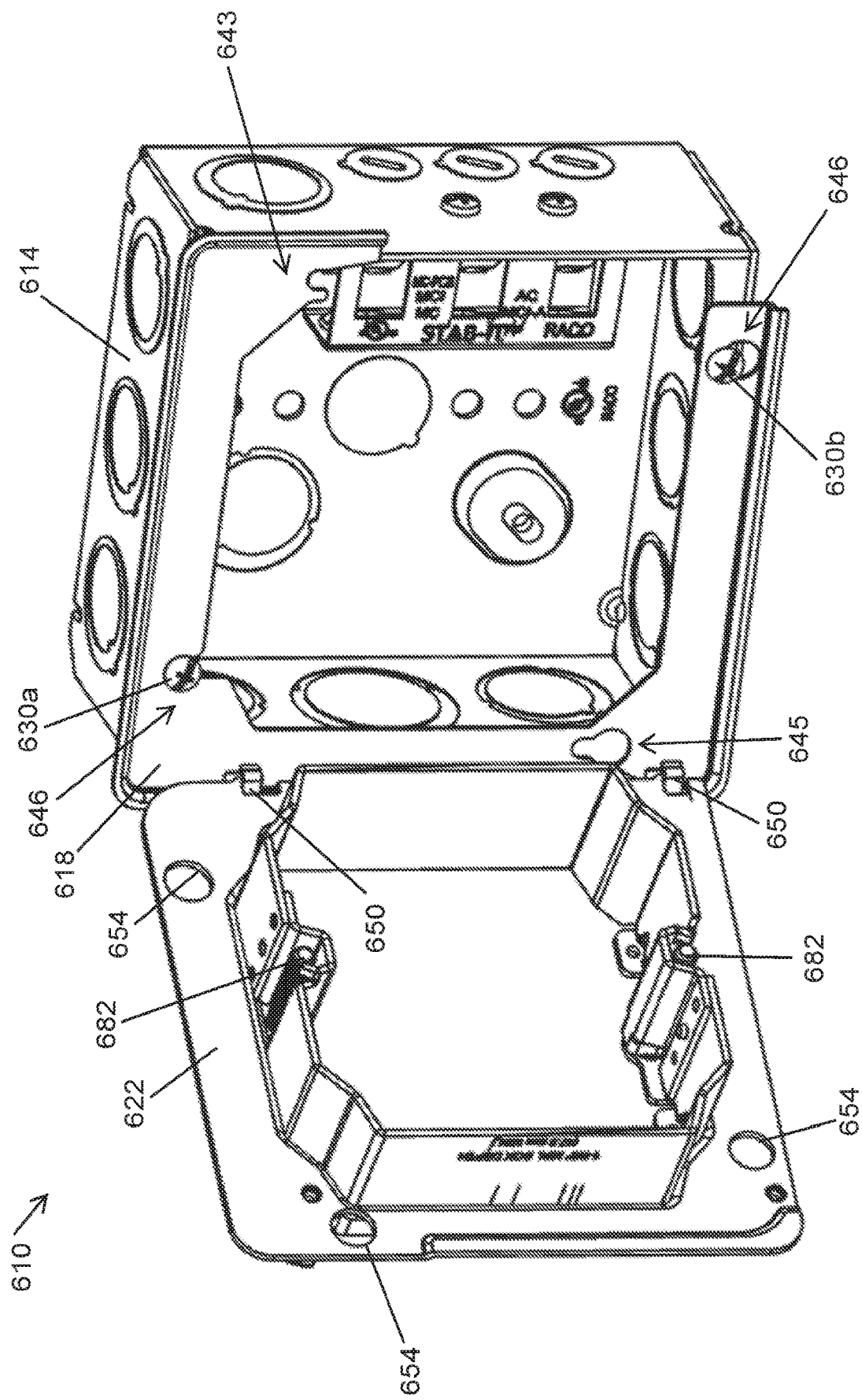
FIG. 22 is a perspective view of the support member and junction box of FIG. 21, with the cover in an open position.
Figure 23:
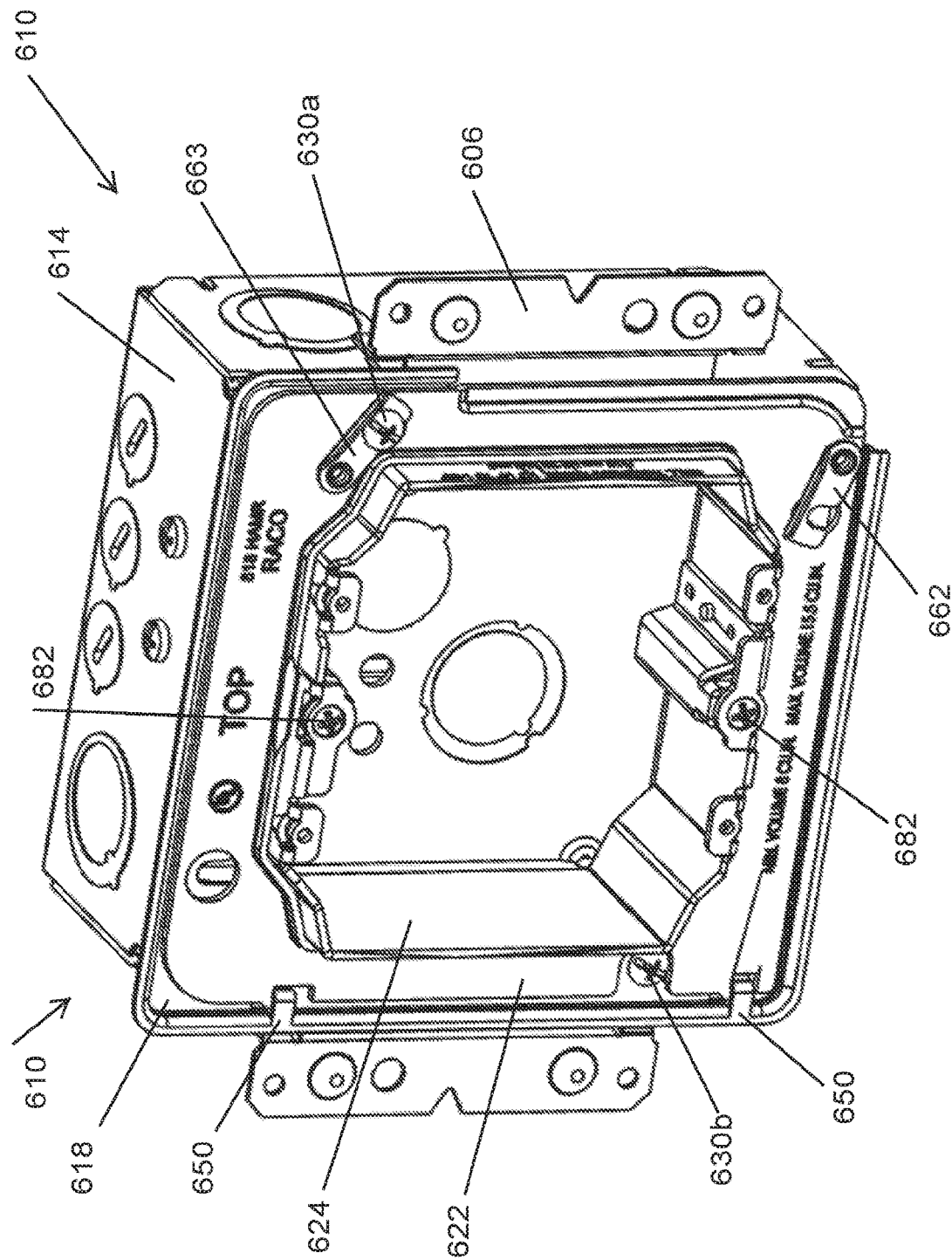
FIG. 23 is a perspective view of the support member and junction box of FIG. 21, with the junction box rotated relative to the support member and the cover in the closed position.
Figure 24:
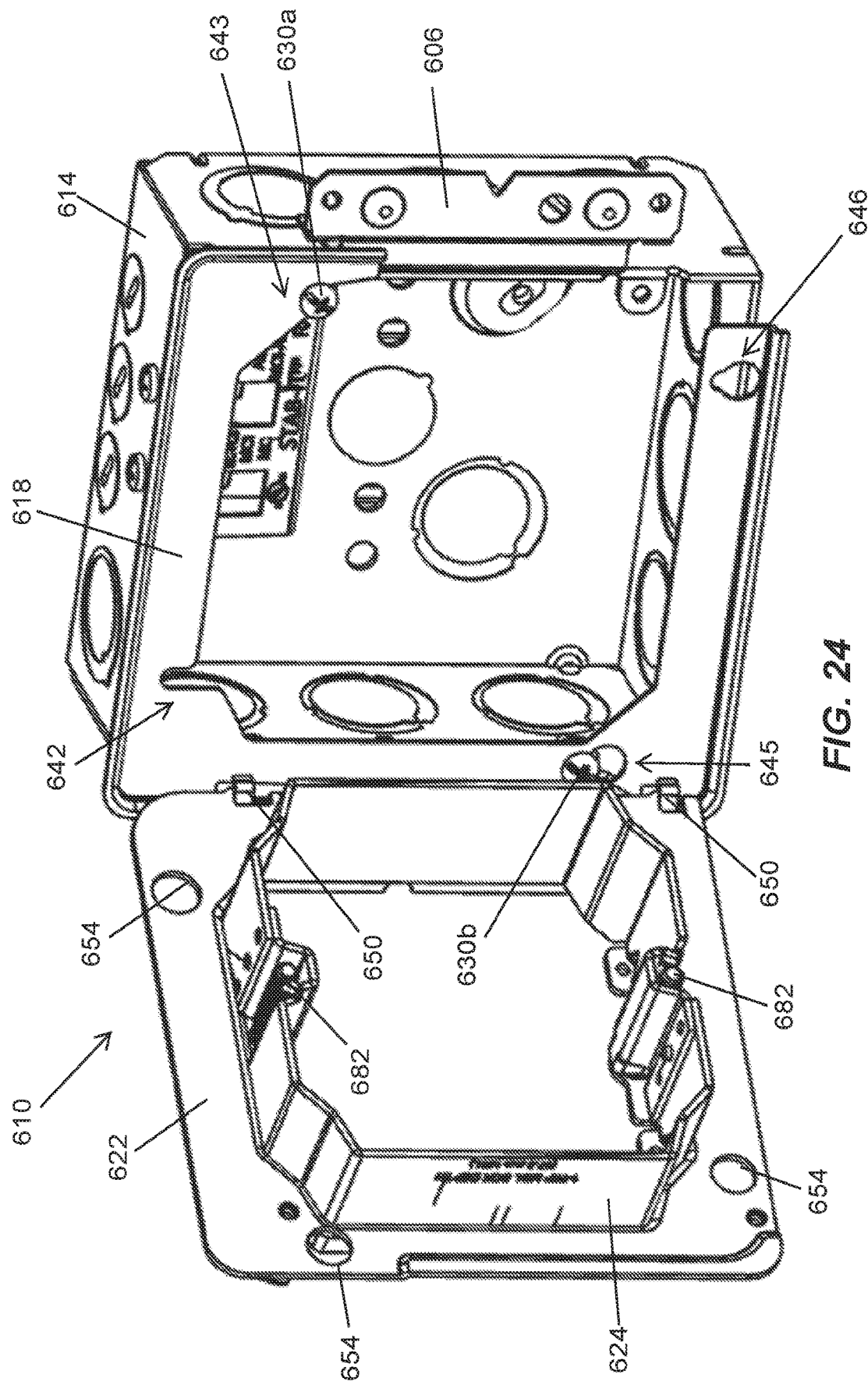
FIG. 24 is a perspective view of the support member and junction box of FIG. 21, with the junction box rotated relative to the support member and the cover in the open position.
Figure 25:
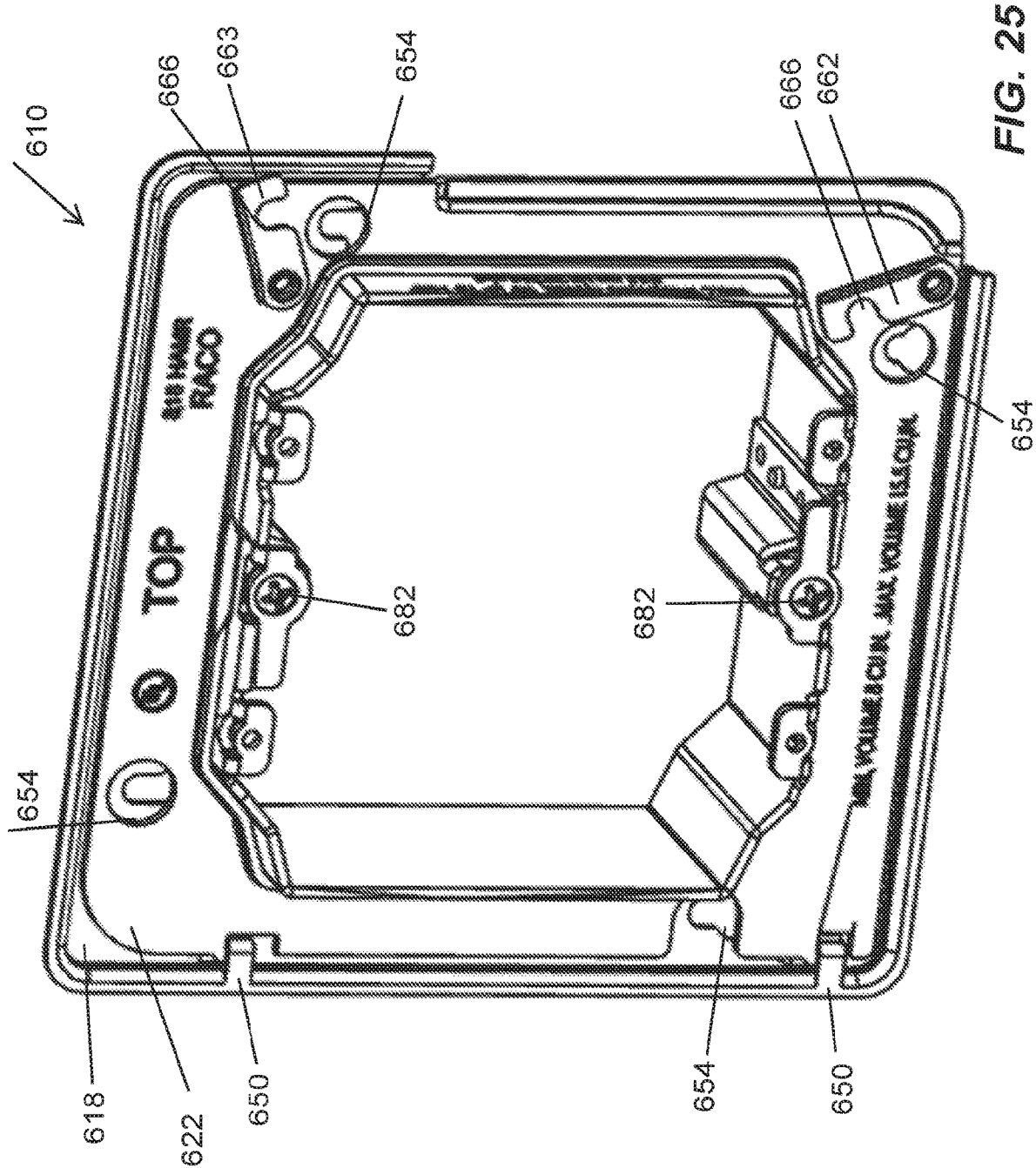
FIG. 25 is a perspective view of the support member of FIG. 21, with the cover in the closed position.
Figure 26:
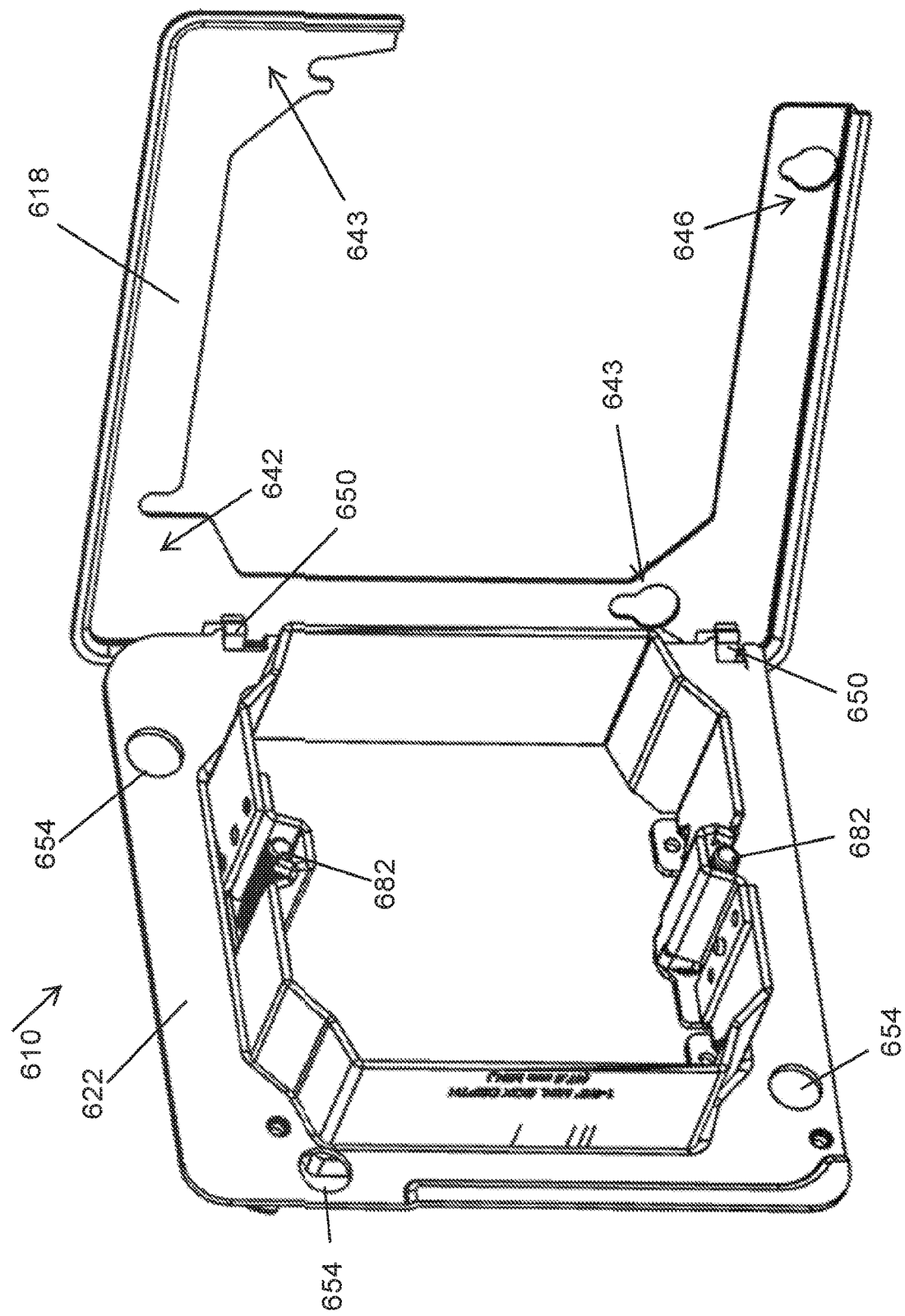
FIG. 26 is a perspective view of the support member of FIG. 21, with the cover in the open position.

As shown in FIGS. 15-20, the base member 518 supports the cover 522 for pivoting movement between a closed position (FIGS. 15, 17, 19) and an open position (FIGS. 16, 18, 20). The cover includes clearance holes 554 that align with the fasteners 30 when the cover 522 is in the closed position. The mud ring 510 includes a first latch 562 and a second latch 563, each movable between latched and unlatched positions. In the illustrated embodiments, each latch 562, 563 is an arm supported for pivoting movement on the cover 522 and includes a slot 566 (FIG. 19). When the junction box 514 is in the first position, the first latch 562 engages the fastener 30b to secure the cover 522 against movement relative to the base member 518. When the junction box 514 is in the second position, the second latch 563 engages the fastener 30b to secure the cover 522 against movement relative to the base member 518.

In some embodiments, the base member 518 is capable of being secured to either a 4-inch junction box or a 4 11/16-inch junction box.

FIGS. 21-27 illustrate a mud ring 610 according to another embodiment. The mud ring 610 is substantially similar to the mud ring 510 and similar features of the mud ring 610 are identified using similar reference numbers to mud ring 510, plus 100. Some differences between the mud ring 510 and the mud ring 610 are discussed herein.

The mud ring 610 is a double gang mud ring capable of supporting multiple electrical devices (not shown) relative to a junction box 614 in a first or second position. In the illustrated embodiment, the mud ring 610 includes an insert 624 capable of supporting two electrical devices. Actuators 682 are positioned adjacent upper and lower edges of the insert 624 and between the electrical devices.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A mud ring for supporting an electrical device with respect to a junction box, the mud ring comprising:
a base member configured to be coupled to the junction box;
a cover coupled to the base member for movement between a first position and a second position, the cover including an opening;

an insert positioned in the opening and supported for movement relative to the cover, the insert configured to be coupled to the electrical device;

an actuator coupled between the insert and the cover for driving the insert to move relative to the cover, wherein the insert includes a first portion to limit movement of the insert in a first direction relative to the cover and a second portion to limit movement of the insert in a second direction opposite the first direction.

2. The mud ring of claim 1, further comprising a latch for selectively securing the cover against movement relative to the base member.

3. The mud ring of claim 2, wherein the latch is movable between a latched position and an unlatched position, and, when the latch is in the latched position, the latch engages a fastener to secure the cover against movement relative to the base member.

4. The mud ring of claim 1, wherein the base member is configured to extend along a portion of a perimeter of the junction box, a first portion of the base member secured to one corner of the junction box and a second portion of the base member positioned adjacent an opposite corner of the junction box.

5. The mud ring of claim 1, wherein the base member has a substantially L-shaped profile.

6. The mud ring of claim 1, wherein the base member has a substantially C-shaped profile.

7. The mud ring of claim 1, wherein the base member is capable of being secured to the junction box in a first configuration and a second configuration.

8. The mud ring of claim 1, wherein the base member has a profile that extends around fastener mounting portions of the junction box.

9. The mud ring of claim 1, wherein the actuator extends through a first flange in the insert and a second flange in the cover.

10. The mud ring of claim 1, wherein the actuator includes a threaded fastener supported for free rotation relative to one of the insert and the cover, rotation of the threaded fastener causing the insert to translate relative to the cover in a direction normal to a plane of the cover.

11. A mud ring for supporting an electrical device with respect to an electrical box, the mud ring comprising:

a base member configured to be coupled to an electrical box via a fastener;

a cover coupled to the base member for pivoting movement about a pivot axis between a closed position and an open position, the cover permitting access to an interior portion the electrical box in the open position, the cover including an opening;

an insert positioned in the opening and supported for movement relative to the cover in a direction oriented perpendicular to the pivot axis, the insert configured to be coupled to the electrical device; and a latch for selectively securing the cover against movement relative to the base member, wherein the latch is rotatable between a latched position and an unlatched position, and, when the latch is in the latched position, the latch engages the fastener to secure the cover against movement relative to the base member.

12. The mud ring of claim 11, wherein the latch includes an arm pivotally supporting on the cover and a slot for receiving the fastener.

13. The mud ring of claim 11, wherein the base member is configured to extend along a portion of a perimeter of the electrical box, a first portion of the base member secured to one corner of the electrical box and a second portion of the base member positioned adjacent an opposite corner of the electrical box.

14. The mud ring of claim 11, wherein the base member is configured to be coupled to the electrical box by a plurality of fasteners, wherein the plurality of fasteners may engage the base member in a plurality of configurations.

15. The mud ring of claim 11, wherein the base member has a profile that extends around fastener mounting portions of the electrical box.

16. The mud ring of claim 11, wherein the base member has a substantially L-shaped profile.

17. The mud ring of claim 11, wherein the base member has a substantially C-shaped profile.

18. The mud ring of claim 11, further comprising an actuator coupled between the insert and the cover for driving the insert to move relative to the cover.

19. The mud ring of claim 18, wherein the actuator includes a threaded fastener supported for free rotation relative to one of the insert and the cover, rotation of the threaded fastener causing the insert to translate relative to the cover in a direction normal to a plane of the cover.

20. The mud ring of claim 3, wherein the latch is rotatable between the latched position and the unlatched position.

* * * * *